United States Patent
Gao et al.

(10) Patent No.: US 12,057,972 B2
(45) Date of Patent: Aug. 6, 2024

(54) CHANNEL ESTIMATION METHOD AND APPARATUS

(71) Applicant: HUAWEI TECHNOLOGIES CO., LTD., Guangdong (CN)

(72) Inventors: Xiang Gao, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 17/732,786

(22) Filed: Apr. 29, 2022

(65) Prior Publication Data

US 2022/0278876 A1 Sep. 1, 2022

Related U.S. Application Data

(63) Continuation of application No. PCT/CN2020/111728, filed on Aug. 27, 2020.

(30) Foreign Application Priority Data

Oct. 31, 2019 (CN) .......................... 201911055773.9

(51) Int. Cl.
H04L 25/02 (2006.01)
H04B 7/0413 (2017.01)

(52) U.S. Cl.
CPC ....... *H04L 25/0242* (2013.01); *H04B 7/0413* (2013.01)

(58) Field of Classification Search
CPC ............. H04L 25/0242; H04L 25/0202; H04L 25/024; H04L 25/0246; H04L 25/0252;
(Continued)

(56) References Cited

U.S. PATENT DOCUMENTS 7,050,513 B1 * 5/2006 Yakhnich ............ H04L 25/0242
375/233
7,486,726 B2 * 2/2009 Alexander .......... H04L 27/2662
375/348
(Continued)

FOREIGN PATENT DOCUMENTS

CN 1767514 A 5/2006
CN 103997474 A 8/2014
(Continued)

OTHER PUBLICATIONS

Abuthinien et al., "Semi-blind Joint Maximum Likelihood Channel Estimation and Data Detection for MIMO Systems," IEEE Signal Processing Letters, vol. 15, Jan. 2008, 4 pages.
(Continued)

*Primary Examiner* — James M Perez
(74) *Attorney, Agent, or Firm* — Fish & Richardson P.C.

(57) ABSTRACT

This disclosure provides channel estimation methods and apparatuses. One method includes: determining Ps initial sample channel matrices that indicate channel states, where the Ps initial sample channel matrices include P1 first sample channel matrices and Ps-P1 second sample channel matrices, the P1 first sample channel matrices are determined based on a previous sample channel matrix or a given reference signal, and Ps is an integer greater than 1; and determining a channel matrix based on the Ps initial sample channel matrices, and obtaining a channel estimation result. Because the P1 initial sample channel matrices in the Ps initial sample channel matrices are determined based on the previous sample channel matrix or the given reference signal, an initial channel estimation result may be provided as an iterative initial sample channel matrix.

15 Claims, 11 Drawing Sheets

(58) Field of Classification Search
CPC ............ H04L 25/0256; H04L 25/0258; H04B 7/0413
See application file for complete search history.

(56) References Cited

U.S. PATENT DOCUMENTS

| | | | | |
|---|---|---|---|---|
| 8,073,067 B2* | 12/2011 | Zeira | ............ | H04B 7/0837 375/262 |
| 8,249,195 B2* | 8/2012 | Kanzaki | ............ | H04B 7/0848 375/316 |
| 8,526,548 B2* | 9/2013 | Gu | ............ | H04B 1/7093 370/320 |
| 8,687,516 B2* | 4/2014 | Zhang | ............ | H04W 16/14 370/252 |
| 8,989,016 B2* | 3/2015 | Xiao | ............ | H04L 25/0204 370/329 |
| 9,253,009 B2* | 2/2016 | Steele | ............ | H04L 25/0204 |
| 9,379,917 B2* | 6/2016 | Vilaipornsawai | ............ | H04L 25/03114 |
| 9,444,576 B2* | 9/2016 | Huang | ............ | H04L 1/0026 |
| 9,756,178 B2* | 9/2017 | Tu | ............ | H04M 3/34 |
| 9,813,112 B2* | 11/2017 | Lv | ............ | H04L 5/0042 |
| 9,847,865 B2* | 12/2017 | Moher | ............ | H04B 1/525 |
| 9,966,983 B2* | 5/2018 | Moher | ............ | H04B 1/0475 |
| 9,973,236 B2* | 5/2018 | Lv | ............ | H04L 12/6418 |
| 10,075,260 B2* | 9/2018 | Lv | ............ | H04L 25/03006 |
| 10,079,634 B2* | 9/2018 | Khlebnikov | ............ | H04B 7/063 |
| 10,128,983 B2* | 11/2018 | Robert Safavi | ............ | H04B 1/707 |
| 10,135,639 B2* | 11/2018 | Wang | ............ | H04L 25/022 |
| 10,891,537 B2* | 1/2021 | Wang | ............ | G06F 17/16 |
| 11,063,724 B1* | 7/2021 | Sethuraman | ............ | H04L 5/0048 |
| 11,271,659 B1* | 3/2022 | Jana | ............ | H04L 5/0005 |
| 11,393,482 B2* | 7/2022 | Li | ............ | G10L 19/008 |
| 11,722,202 B1* | 8/2023 | Neshaastegaran | ............ | H04B 7/0617 375/267 |
| 2007/0268981 A1* | 11/2007 | Heiskala | ............ | H04L 1/06 375/267 |
| 2008/0165874 A1* | 7/2008 | Steele | ............ | H04L 27/3863 375/261 |
| 2009/0207932 A1* | 8/2009 | Kanzaki | ............ | H04B 7/0619 375/267 |
| 2011/0014885 A1* | 1/2011 | Fitch | ............ | H04B 7/0641 455/115.1 |
| 2011/0142182 A1* | 6/2011 | Gu | ............ | H04B 1/7093 375/343 |
| 2012/0063494 A1* | 3/2012 | Frenne | ............ | H04B 7/0634 375/296 |
| 2012/0155318 A1* | 6/2012 | Zhang | ............ | H04W 16/14 370/252 |
| 2013/0044602 A1* | 2/2013 | Xiao | ............ | H04L 25/0204 370/237 |
| 2015/0244456 A1* | 8/2015 | Layec | ............ | H04B 10/6162 398/25 |
| 2015/0326339 A1* | 11/2015 | Huang | ............ | H04B 7/0413 375/267 |
| 2018/0212799 A1* | 7/2018 | Wang | ............ | H04L 25/0224 |
| 2021/0218522 A1* | 7/2021 | Sethuraman | ............ | H04L 25/0224 |
| 2022/0278876 A1* | 9/2022 | Gao | ............ | H04L 25/03292 |
| 2022/0394723 A1* | 12/2022 | Gao | ............ | H04L 5/0051 |
| 2023/0186606 A1* | 6/2023 | Pan | ............ | G06V 10/774 382/159 |

FOREIGN PATENT DOCUMENTS

| | | |
|---|---|---|
| CN | 108712353 A | 10/2018 |
| CN | 109088666 A | 12/2018 |
| WO | 2007137484 A1 | 12/2007 |
| WO | 2014056864 A1 | 4/2014 |

OTHER PUBLICATIONS

Supplementary European Search Report in European Appln No. 20883349.1, dated Oct. 27, 2022, 13 pages.

Miaosong, "Subspace-based Semi-blind Channel Estimation for MIMO-OFDM Systems," Hubei University of Technology, 2015, 12 pages (with English abstract).

Office Action issued in Chinese Application No. 201911055773.9 on Nov. 3, 2021, 10 pages (with English translation).

PCT International Search Report and Written Opinion issued in International Application No. PCT/CN2020/111728 on Nov. 27, 2020.

Xu et al., "Adaptive Semi-Blind Channel Estimation for Massive MIMO Systems," 2014 12th International Conference on Signal Processing (ICSP), Jan. 22, 2015, 5 pages.

Zhang et al., "Evolutionary-Algorithm-Assisted Joint Channel Estimation and Turbo Multiuser Detection/Decoding for OFDM/SDMA," IEEE Transactions On Vehicular Technology, vol. 63, No. 3, Mar. 2014, 19 pages.

Zhang et al., "Joint Channel Estimation and Multiuser Detection for SDMA/OFDM Based on Dual Repeated Weighted Boosting Search," IEEE Transactions On Vehicular Technology, vol. 60, No. 7, Sep. 2011, 11 bages.

Extended European Search Report in European Appln No. 20883349.1, dated Dec. 14, 2022, 13 pages.

* cited by examiner

FIG. 2(a) Configuration type 1

| | Single symbol | Two symbols | |
|---|---|---|---|
| | ⋮ | ⋮ | ⋮ |
| 11 | 2/3 (+/−) | 2/3/6/7 (+/−/+/−) | 2/3/6/7 (+/−/−/+) |
| 10 | 0/1 (+/−) | 0/1/4/5 (+/−/+/−) | 0/1/4/5 (+/−/−/+) |
| 9 | 2/3 (+/+) | 2/3/6/7 (+/+/+/+) | 2/3/6/7 (+/+/−/−) |
| 8 | 0/1 (+/+) | 0/1/4/5 (+/+/+/+) | 0/1/4/5 (+/+/−/−) |
| 7 | 2/3 (+/−) | 2/3/6/7 (+/−/+/−) | 2/3/6/7 (+/−/−/+) |
| 6 | 0/1 (+/−) | 0/1/4/5 (+/−/+/−) | 0/1/4/5 (+/−/−/+) |
| 5 | 2/3 (+/+) | 2/3/6/7 (+/+/+/+) | 2/3/6/7 (+/+/−/−) |
| 4 | 0/1 (+/+) | 0/1/4/5 (+/+/+/+) | 0/1/4/5 (+/+/−/−) |
| 3 | 2/3 (+/−) | 2/3/6/7 (+/−/+/−) | 2/3/6/7 (+/−/−/+) |
| 2 | 0/1 (+/−) | 0/1/4/5 (+/−/+/−) | 0/1/4/5 (+/−/−/+) |
| 1 | 2/3 (+/+) | 2/3/6/7 (+/+/+/+) | 2/3/6/7 (+/+/−/−) |
| 0 | 0/1 (+/+) | 0/1/4/5 (+/+/+/+) | 0/1/4/5 (+/+/−/−) |
| | Symbol 1 | Symbol 1 | Symbol 2 |

FIG. 2(b) Configuration type 2

| | Single symbol | Two symbols | |
|---|---|---|---|
| | ⋮ | ⋮ | ⋮ |
| 11 | 4/5 (+/−) | 4/5/10/11 (+/−/+/−) | 4/5/10/11 (+/−/−/+) |
| 10 | 4/5 (+/+) | 4/5/10/11 (+/+/+/+) | 4/5/10/11 (+/+/−/−) |
| 9 | 2/3 (+/−) | 2/3/8/9 (+/−/+/−) | 2/3/8/9 (+/−/−/+) |
| 8 | 2/3 (+/+) | 2/3/8/9 (+/+/+/+) | 2/3/8/9 (+/+/−/−) |
| 7 | 0/1 (+/−) | 0/1/6/7 (+/−/+/−) | 0/1/6/7 (+/−/−/+) |
| 6 | 0/1 (+/+) | 0/1/6/7 (+/+/+/+) | 0/1/6/7 (+/+/−/−) |
| 5 | 4/5 (+/−) | 4/5/10/11 (+/−/+/−) | 4/5/10/11 (+/−/−/+) |
| 4 | 4/5 (+/+) | 4/5/10/11 (+/+/+/+) | 4/5/10/11 (+/+/−/−) |
| 3 | 2/3 (+/−) | 2/3/8/9 (+/−/+/−) | 2/3/8/9 (+/−/−/+) |
| 2 | 2/3 (+/+) | 2/3/8/9 (+/+/+/+) | 2/3/8/9 (+/+/−/−) |
| 1 | 0/1 (+/−) | 0/1/6/7 (+/−/+/−) | 0/1/6/7 (+/−/−/+) |
| 0 | 0/1 (+/+) | 0/1/6/7 (+/+/+/+) | 0/1/6/7 (+/+/−/−) |
| | Symbol 1 | Symbol 1 | Symbol 2 |

CHANNEL ESTIMATION METHOD AND APPARATUS

CROSS-REFERENCE TO RELATED APPLICATIONS

This application is a continuation of International Application No. PCT/CN2020/111728, filed on Aug. 27, 2020, which claims priority to Chinese Patent Application No. 201911055773.9, filed on Oct. 31, 2019. The disclosures of the aforementioned applications are hereby incorporated by reference in their entireties.

TECHNICAL FIELD

This application relates to the field of mobile communication technologies, and in particular, to a channel estimation method and apparatus.

BACKGROUND

To reduce reference signal overheads and improve accuracy of multiple-input multiple-output (Multiple Input and Multiple Output, MIMO) channel estimation, blind channel estimation attracts more attention and research. A core idea of blind channel estimation is to perform channel estimation based on a data signal. A channel estimation result close to an optimal channel estimation result is obtained through joint iteration between MIMO signal detection and a channel estimation algorithm.

However, effects of the existing blind channel estimation method are not desirable, and accuracy of a channel estimation result and a speed of obtaining the channel estimation result need to be improved.

SUMMARY

This application provides a channel estimation method and apparatus, to improve accuracy of a channel estimation result and a speed of obtaining the channel estimation result.

According to a first aspect, this application provides a channel estimation method. The method includes: determining Ps initial sample channel matrices that indicate channel states, where the Ps initial sample channel matrices include P1 first sample channel matrices and Ps-P1 second sample channel matrices, the P1 first sample channel matrices are determined based on a previous sample channel matrix or a given reference signal, Ps is an integer greater than 1, and Pt is a positive integer less than or equal to Ps; and determining a channel matrix based on the Ps initial sample channel matrices, and obtaining a channel estimation result.

Based on the foregoing solution, the P1 initial sample channel matrices (namely, the P1 first sample channel matrices) in the Ps initial sample channel matrices are determined based on the previous sample channel matrix or the given reference signal. Therefore, an initial channel estimation result may be provided as an iterative initial sample channel matrix. In this way, a channel estimation result close to an optimal result can be quickly obtained. This can accelerate optimization convergence, reduce computational complexity, improve accuracy of the channel estimation result, and increase a speed of obtaining the channel estimation result.

In a possible implementation, at least one of the Ps-P1 second sample channel matrices is a sum of any one of the P1 first sample channel matrices and a first perturbation matrix, and each element in the first perturbation matrix is a complex-valued Gaussian random variable whose average value is 0 and variance is $\sigma^2$.

In a possible implementation, at least one of the Ps-P1 second sample channel matrices is generated based on a preset random algorithm.

In a possible implementation, at least one of the Ps-P1 second sample channel matrices is obtained by performing channel estimation based on at least one group of signal detection results in a plurality of groups of signal detection results, where the plurality of groups of signal detection results are obtained by grouping data signal detection results, and the data signal detection results are obtained by detecting a data signal by using any one of the P1 first sample channel matrices. To be specific, the data signal is detected by using any one of the P1 first sample channel matrices, to obtain the data signal detection results; the data signal detection results are grouped to obtain the plurality of groups of signal detection results, and channel estimation is performed based on the at least one group of signal detection results in the plurality of groups of signal detection results, to obtain the at least one of the Ps-P1 second sample channel matrices.

According to the foregoing solution, an initial channel estimation result may be obtained based on the preset reference signal. An initial estimation result of the data signal may be obtained based on the channel estimation result. In the foregoing solution, initial data signal detection results are effectively used in an initialization algorithm of iterative channel estimation. The data signal detection results corresponding to the channel estimation results obtained based on the reference signal are grouped, channel estimation is separately performed on each group of data signal detection results, and the obtained channel estimation result is used as an initial candidate value of initial iteration. A channel estimation result close to an optimal estimation result can be quickly obtained, thereby avoiding blindly selecting an initialized channel matrix in the initial iteration.

According to a second aspect, this application provides a channel estimation method. The method includes: obtaining a channel matrix by processing a data signal and a sample channel matrix for N times, where N is a positive integer, and single-time processing includes the following steps: detecting the data signal by using third sample channel matrices, to obtain data signal detection results; grouping the data signal detection results, to obtain a plurality of groups of signal detection results; and performing channel estimation based on at least one group of signal detection results in the plurality of groups of signal detection results, to obtain at least one estimated channel matrix.

According to the foregoing solution, the data signal detection results are effectively used. The data signal detection results are grouped, and channel estimation is separately performed on each group of data signal detection results as an initial candidate value of next iteration. The data signal detection results have different detection accuracy rates. A channel estimation result corresponding to a signal block having a higher detection accuracy rate is more accurate and is closer to an optimal channel estimation result, and therefore has a greater contribution effect in next iteration. Therefore, this solution provides an effective iterative detection convergence direction. A benign cycle is formed through data signal detection, convergence is fast, and calculation complexity and a calculation delay are effectively reduced.

The data signal detection means estimating a sent data signal based on a received signal or an observed signal at a receive end, where the received signal or the observed signal corresponds to the data signal that passes through a channel.

In a possible implementation, a third sample channel matrix used in the first time of processing in the N times of processing is a channel matrix having an optimal cost function value in Ps initial sample channel matrices on which processing is performed.

In a possible implementation, the Ps initial sample channel matrices include P1 first sample channel matrices and Ps-P1 second sample channel matrices, the P1 first sample channel matrices are determined based on a previous sample channel matrix or a given reference signal, Ps is an integer greater than 1, and P1 is a positive integer less than or equal to Ps.

In a possible implementation, at least one of the Ps-P1 second sample channel matrices is a sum of any one of the P1 first sample channel matrices and a first perturbation matrix, and each element in the first perturbation matrix is a complex-valued Gaussian random variable whose average value is 0 and variance is $\sigma^2$.

In a possible implementation, at least one of the Ps-P1 second sample channel matrices is generated based on a preset random algorithm.

In a possible implementation, at least one of the Ps-P1 second sample channel matrices is obtained by performing channel estimation based on the at least one group of signal detection results in the plurality of groups of signal detection results, where the plurality of groups of signal detection results are obtained by grouping the data signal detection results, and the data signal detection results are obtained by detecting the data signal by using any one of the P1 first sample channel matrices. To be specific, the data signal is detected by using any one of the P1 first sample channel matrices, to obtain the data signal detection results; the data signal detection results are grouped to obtain the plurality of groups of signal detection results; and channel estimation is performed based on the at least one group of signal detection results in the plurality of groups of signal detection results, to obtain the at least one of the Ps-P1 second sample channel matrices. In a possible implementation, the Ps initial sample channel matrices are randomly generated sample channel matrices.

In a possible implementation, a third sample channel matrix used in processing other than the first time of processing in the N times of processing is a channel matrix having an optimal cost function value.

In a possible implementation, the channel matrix having the optimal cost function value is obtained by processing a plurality of fourth sample channel matrices, and the plurality of fourth sample channel matrices include at least one of the estimated channel matrices.

In a possible implementation, the plurality of fourth sample channel matrices further include a randomly generated sample channel matrix.

In a possible implementation, at least one of the plurality of fourth sample channel matrices is a sum of the third sample channel matrix and a second perturbation matrix, and each element in the second perturbation matrix is a complex-valued Gaussian random variable whose average value is 0 and variance is $\sigma^2$.

In a possible implementation, at least one of the fourth sample channel matrices is generated based on a preset random algorithm.

In a possible implementation, at least one of the fourth sample channel matrices is obtained by performing channel estimation based on the at least one group of signal detection results in the plurality of groups of signal detection results, where the plurality of groups of signal detection results are obtained by grouping the data signal detection results, and the data signal detection results are obtained by detecting the data signal by using any one of the P1 first sample channel matrices.

According to a third aspect, this application further provides a reference signal resource configuration method. The method includes: receiving configuration information of a reference signal from a network device; and determining, based on the configuration information of the reference signal, that a resource of the reference signal is not configured.

According to this solution, it may be determined, based on the received configuration information of the reference signal, that the resource of the reference signal is not configured. This solution may be used in combination with the foregoing channel estimation method in this application. Because no DMRS resource needs to be configured, no DMRS port needs to be indicated, so that overheads of downlink control information can be reduced.

In a possible implementation, the configuration information of the reference signal includes first indication information; and the determining, based on the configuration information of the reference signal, that a resource of the reference signal is not configured includes: determining, based on the first indication information, that the resource of the reference signal is not configured.

In a possible implementation, the determining, based on the configuration information of the reference signal, that a resource of the reference signal is not configured includes: when determining that the configuration information of the reference signal does not include second indication information, determining that the resource of the reference signal is not configured, where the second indication information is for indicating a preset-type reference signal, and the preset-type reference signal indicates that a reference signal is configured for a terminal device.

In a possible implementation, the reference signal is a DMRS, and the preset-type reference signal indicated by the second indication information is a configuration type 1 or a configuration type 2.

According to a fourth aspect, this application further provides a reference signal resource configuration method. The method includes: receiving third indication information and a preset-type reference signal from a network device, where the third indication information is for indicating that a frequency domain resource actually occupied by a reference signal is less than or equal to a frequency domain resource corresponding to the preset-type reference signal; and determining, based on the third indication information and the preset-type reference signal, the frequency domain resource actually occupied by the reference signal.

According to this solution, a new DMRS type does not need to be defined based on an existing DMRS configuration. The indication information may be for indicating that the frequency domain resource occupied by the configured reference signal is a subset of DMRS frequency domain resources in the existing configuration. This improves flexibility of configuring the reference signal while compatibility of the existing DMRS configuration is considered.

In a possible implementation, the third indication information indicates a first ratio of the frequency domain resource actually occupied by the reference signal to the frequency domain resource occupied by the preset-type reference signal.

In a possible implementation, the first ratio is 0. The determining, based on the first indication information and the preset-type reference signal, the frequency domain resource actually occupied by the reference signal includes: determining, based on the first ratio and the preset-type reference signal, that the frequency domain resource of the reference signal is not configured.

In a possible implementation, the first ratio is a positive number less than or equal to 1. The method further includes: receiving fourth indication information from the network device, where the fourth indication information is for indicating an offset of a time domain resource actually occupied by the reference signal relative to a time domain resource occupied by the preset-type reference signal; and determining, based on the fourth indication information and the preset type of the reference signal, the time domain resource actually occupied by the reference signal.

In a possible implementation, the reference signal is a DMRS, the preset type of the reference signal is a configuration type 1 or a configuration type 2.

According to a fifth aspect, this application provides a communication apparatus. The apparatus may be a terminal device or a network device, or may be a chip used for the terminal device or the network device. The apparatus has a function of implementing the first aspect, embodiments of the first aspect, the second aspect, or embodiments of the second aspect. The function may be implemented by hardware, or may be implemented by hardware executing corresponding software. The hardware or the software includes one or more modules corresponding to the function.

According to a sixth aspect, this application provides a communication apparatus. The apparatus may be a terminal device or a chip used for the terminal device. The apparatus has a function of implementing the third aspect, embodiments of the third aspect, the fourth aspect, or embodiments of the fourth aspect. The function may be implemented by hardware, or may be implemented by hardware executing corresponding software. The hardware or the software includes one or more modules corresponding to the function.

According to a seventh aspect, this application provides a communication apparatus, including a processor and a memory. The memory is configured to store computer-executable instructions. When the apparatus runs, the processor executes the computer-executable instructions stored in the memory, to enable the apparatus to perform the method in the foregoing aspects or the embodiments of the foregoing aspects.

According to an eighth aspect, this application provides a communication apparatus, including a unit or means configured to perform the foregoing aspects or the steps in the foregoing aspects.

According to a ninth aspect, this application provides a communication apparatus, including a processor and an interface circuit. The processor is configured to communicate with another apparatus through the interface circuit, and perform the methods in the foregoing aspects or the embodiments of the foregoing aspects. There are one or more processors.

According to a tenth aspect, this application provides a communication apparatus, including a processor, configured to be connected to a memory, and invoke a program stored in the memory, to perform the methods in the foregoing aspects or the embodiments of the foregoing aspects. The memory may be located inside the apparatus, or may be located outside the apparatus. In addition, there are one or more processors.

According to an eleventh aspect, this application further provides a computer-readable storage medium. The computer-readable storage medium stores instructions. When the instructions are run on a computer, a processor is enabled to perform the methods in the foregoing aspects or the embodiments of the foregoing aspects.

According to a twelfth aspect, this application further provides a computer program product including instructions. When the computer program product runs on a computer, the computer is enabled to perform the methods in the foregoing aspects or the embodiments of the foregoing aspects.

According to a thirteenth aspect, this application further provides a chip system, including at least one processor and a communication interface. The processor executes a program, to perform the methods in the foregoing aspects or the embodiments of the foregoing aspects.

BRIEF DESCRIPTION OF DRAWINGS

FIG. 2(a) and FIG. 2(b) show DMRS configuration types defined in NR Release 15;

DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In descriptions of this application, unless otherwise noted, "a plurality of" means two or more.

Figure 1:
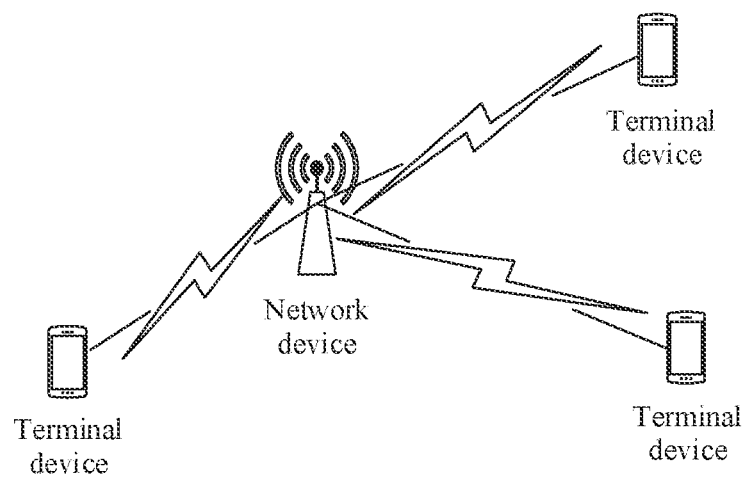
FIG. 1 is a schematic diagram of a possible network architecture according to this application.

FIG. 1 is a schematic diagram of a possible network architecture to which this application is applicable. The architecture includes a network device and at least one terminal device. The network device and the terminal device may work in a new radio (NR) communication system, and the terminal device may communicate with the network device through the NR communication system. Alternatively, the network device and the terminal device may work in another communication system. This is not limited in embodiments of this application.

The terminal device may be a wireless terminal device that can receive scheduling and indication information of the network device. The wireless terminal device may be a device that provides a user with voice and/or data connectivity, a handheld device with a wireless connection function, or another processing device connected to a wireless modem. The wireless terminal device may communicate with one or more core networks or the Internet through a radio access network (RAN). The wireless terminal device may be a mobile terminal device, for example a mobile telephone (also referred to as a "cellular" phone or a mobile phone), a computer, and a data card. For example, the wireless terminal device may be a portable, pocket-sized, handheld, computer built-in, or vehicle-mounted mobile apparatus that exchanges language and/or data with the radio access network. For example, the wireless terminal device may be a device such as a personal communications service (PCS) phone, a cordless phone, a session initiation protocol (SIP) phone, a wireless local loop (WLL) station, a personal digital assistant (PDA), a tablet computer (Pad), and a computer having a wireless transceiver function. The wireless terminal device may also be referred to as a system, a subscriber unit, a subscriber station, a mobile station, a mobile station (MS), a remote station, an access point (AP), a remote terminal device (remote terminal), an access terminal device (access terminal), a user terminal device (user terminal), a user agent, a subscriber station (SS), customer premises equipment (CPE), a terminal, user equipment (UE), a mobile terminal (MT), or the like. Alternatively, the terminal device may be a wearable device, a terminal device in a next-generation communication system such as a 5G network, a terminal device in a future evolved public land mobile network (PLMN), a terminal device in an NR communication system, or the like.

The network device is an entity configured to transmit or receive a signal on a network side, for example, a generation NodeB (gNodeB). The network device may be a device configured to communicate with a mobile device. The network device may be an AP in a wireless local area network (wireless local area networks, WLANs), an evolved NodeB (eNB or eNodeB) in long term evolution (LTE), a relay station or an access point, a vehicle-mounted device, a wearable device and a network device in a 5G network, a network device in a future evolved public land mobile network (PLMN), a gNodeB in an NR system, or the like. In addition, in embodiments of this application, the network device serves a terminal device in a cell, and the terminal device communicates with the network device by using a transmission resource (for example, a frequency domain resource or a spectrum resource) used in the cell. The cell may be a cell corresponding to the network device (for example, a base station). The cell may belong to a macro base station or may belong to a base station corresponding to a small cell. There may be the following types of small cells: a metro cell, a micro cell, a pico cell, a femto cell, and the like. These cells are characterized by small coverage, low transmit power, and the like, and are suitable for providing a high-rate data transmission service. In addition, in another possible case, the network device may be another apparatus that provides a wireless communication function for the terminal device. A specific technology and a specific device form that are used by the network device are not limited in embodiments of this application. For ease of description, in embodiments of this application, an apparatus that provides the wireless communication function for a terminal device is referred to as a network device.

In a MIMO system, a symbol vector sent by a transmitter is transmitted through a radio channel, and a received signal is usually distorted due to impact of a channel characteristic. To recover the transmitted signal, a receiver needs to estimate and compensate for the impact of the channel. Therefore, an accurate channel estimation result is a key factor for ensuring performance of the MIMO system. When sending a data signal, the transmitter usually needs to send a reference signal for channel estimation. When the reference signal can be obtained, a least squares (LS) algorithm and a minimum mean square error (Minimum Mean Squared Error, MMSE) channel estimation algorithm may be used to provide good performance, which are widely applied to a current communication system.

For the MIMO system, assuming that K consecutive transmitted symbol vectors pass through a same channel matrix, a receive symbol matrix Y may be represented as a product of a channel matrix H and a transmit symbol matrix X, that is, Y=HX+N. A dimension of the transmit symbol matrix X is R×K, each column vector in the transmit symbol matrix X corresponds to one of the K transmitted symbol vectors, and the K transmitted symbol vectors may correspond to different frequency domain and/or time domain resources, or correspond to different resource elements (REs). The receive symbol matrix corresponds to the transmit symbol matrix, and may be an observation result of the transmit symbol matrix on a receive side. In an implementation, the K transmitted symbol vectors may correspond to different subcarriers of a same orthogonal frequency division multiplexing (OFDM) symbol, or correspond to different subcarriers of a plurality of OFDM symbols. A dimension of the receive symbol matrix Y is $N_R \times K$, and a dimension of the channel matrix H is $N_R \times R$, where $N_R$ is a quantity of receive antennas, R is a rank, and N is a noise matrix whose dimension is $N_R \times K$.

The LS channel estimation algorithm uses formula (1) as a cost function.

$$J(\hat{H}) = |Y - X\hat{H}|^2 \qquad (1)$$

X is a sent reference signal vector, and Y is a correspondingly received reference signal vector. To obtain an optimal channel estimation result, a value of the cost function (1) needs to be minimized. Therefore, a solution of LS channel estimation may be obtained: $\hat{H}_{LS}=(X^H X)^{-1} X^H Y$. It can be learned that the LS channel estimation is easy to be implemented, but noise is not processed. As a result, an MSE of the channel estimation is inversely proportional to a signal-to-noise ratio, and accuracy of the channel estimation result is usually low.

The MMSE channel estimation algorithm uses formula (2) as a cost function.

$$J(\hat{H}) = E\{|H - \hat{H}|^2\} \qquad (2)$$

To obtain an optimal channel estimation result, a value of the cost function (2) needs to be minimized. By using a weighting matrix W, the MMSE channel estimation is defined as $\hat{H}=WH_{LS}$, where $H_{LS}$ is an LS channel estimation result. In the MMSE channel estimation, an MSE value of formula (2) is minimized by selecting W. An MMSE channel estimation result may be deductively obtained as follows:

$$\hat{H} = WH_{LS} = R_{HH_{LS}} R_{HH_{LS}}^{-1} H_{LS} = R_{HH_{LS}} \left( R_{HH_{LS}} + \frac{\sigma_n^2}{\sigma_s^2} I \right)^{-1} H_{LS}$$

$R_{HH_{LS}}$ is a cross-correlation matrix between a real channel matrix and a channel estimation matrix in frequency domain, $\sigma_n^2$ is noise power, and $\sigma_s^2$ is signal power.

Conventional channel estimation algorithms such as the LS channel estimation algorithm and the MMSE channel estimation algorithm described above depend on a predefined reference signal. In addition, a channel response corresponding to a frequency-domain subcarrier or time-domain symbol between reference signals is further estimated by using an interpolation algorithm. Reference signals having higher density may usually bring a more accurate channel estimation result. However, much reference signal overheads reduce spectral efficiency of a system. In an existing NR protocol, a demodulation reference signal (DMRS) is used to estimate an equivalent channel matrix of each user data channel, for data detection and demodulation. The DMRS is usually pre-coded in a same manner as a data channel (physical downlink shared channel (PDSCH)). A method for mapping the DMRS defined in the NR protocol in a time-frequency resource is subsequently described.

Currently, a reference signal-based channel estimation technology is widely applied to various communication systems. For a reference signal-based channel estimation algorithm, a design of a reference signal is very important.

In the current NR protocol, two types of DMRS configuration methods are defined: a configuration type 1 and a configuration type 2. For example, the configuration type 1 may be a DMRS type 1, and the configuration type 2 may be a DMRS type 2. FIG. 2(a) and FIG. 2(b) show DMRS configuration types defined in NR Release 15.

For the configuration type 1, eight DMRS ports are grouped into two code division multiplexing groups (CDM groups), and a time-frequency resource mapping manner of the eight DMRS ports is shown in FIG. 2(a). A CDM group 1 includes a port 0, a port 1, a port 4, and a port 5. A CDM group 2 includes a port 2, a port 3, a port 6, and a port 7. The CDM group 0 and the CDM group 1 are frequency division multiplexed (mapped to different frequency domain resources), and the ports in the CDM group are distinguished by using orthogonal cover code (OCC), to ensure orthogonality of the DMRS ports in the CDM group. This suppresses interference between DMRSs transmitted on the different antenna ports.

For the configuration type 2, 12 DMRS ports are grouped into three code division multiplexing groups (CDM groups). Frequency division multiplexing is used between the CDM groups, orthogonality is ensured in the CDM group by using OCC, and a time-frequency resource mapping manner of the 12 DMRS ports is shown in FIG. 2(b).

The foregoing reference signal-based channel estimation algorithm mainly has the following problems and disadvantages:

(1) As accuracy of a channel estimation result strongly depends on a design of a reference signal, a requirement on the design of the reference signal is high. In the design of reference signals, channel characteristics in different propagation environments need to be fully considered. For a MIMO-OFDM system, both channel changes in time domain and frequency domain need to be considered in the design of the reference signal. In a scenario in which a channel changes fast, dense reference signal mapping is required. In a scenario in which a channel changes slowly, sparse reference signal mapping may be used. Therefore, it is difficult to satisfy channel conditions in various scenarios using a fixed design of a reference signal. It can be learned through evaluation that, compared with an ideal channel, a current NR DMRS design still has a signal-to-noise ratio loss of more than 2 dB in some scenarios.

(2) The design of the reference signal is complex, to obtain an optimal channel estimation result. To avoid interference between antenna ports, it needs to be ensured that reference signals sent by different antenna ports are orthogonal. For example, in the NR DMRS designs shown in FIG. 2(a) and FIG. 2(b), technical solutions such as spatial multiplexing and code division multiplexing are used to ensure orthogonality of the antenna ports. In addition, to ensure channel estimation quality, it needs to be ensured that the reference signal does not collide with another signal. This also brings challenges to a design of a communication protocol, and affects flexibility of a system design to some extent or introduces a complex resource mapping mechanism.

(3) The reference signal affects system spectrum efficiency. Mapping of the reference signal inevitably occupies a time-frequency resource, and the time-frequency resource occupied by the reference signal cannot be used for data transmission. Therefore, a good channel estimation result requires large reference signal overheads, and spectral efficiency is consequently reduced. In the NR DMRS designs shown in FIG. 2(a) and FIG. 2(b), one or two OFDM symbols are used for the reference signal, and cannot be used for data transmission.

To further reduce reference signal overheads and improve accuracy of MIMO channel estimation, blind channel estimation attracts more attention and research. A core idea of blind channel estimation is to perform channel estimation based on a data signal. A channel estimation result close to an optimal channel estimation result is obtained through joint iteration between MIMO signal detection and a channel estimation algorithm.

Figure 3A:
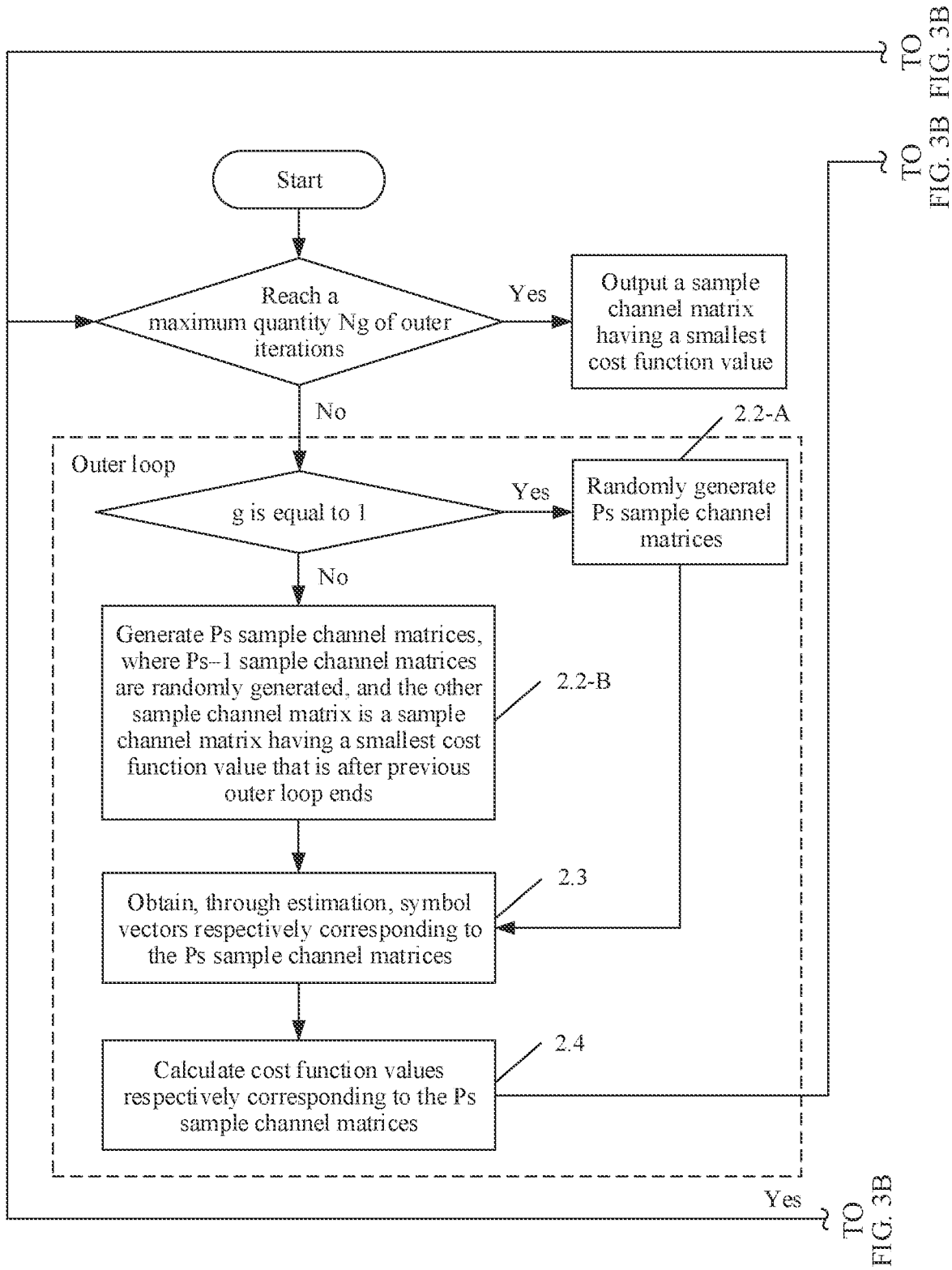
FIG. 3A and FIG. 3B are a flowchart of a genetic algorithm-based blind channel estimation algorithm a according to this application.
Figure 3B:
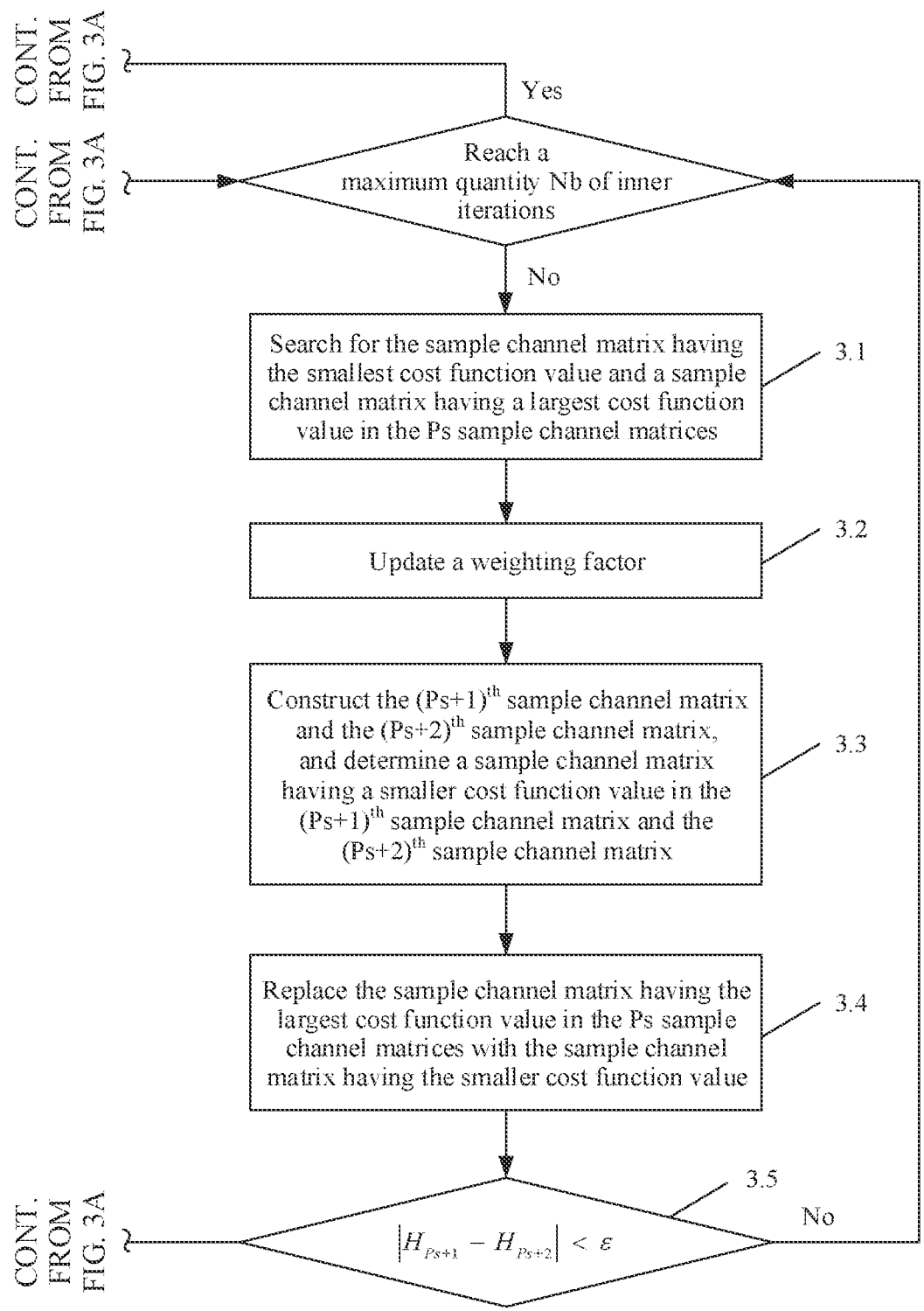

FIG. 3A and FIG. 3B are a flowchart of a genetic algorithm-based channel estimation method according to an embodiment of this application. It is assumed that, for K transmitted symbol vectors, a channel matrix H remains unchanged. The $k^{th}$ receive symbol vector corresponds to the $k^{th}$ transmitted symbol vector. For the $k^{th}$ receive symbol vector, y(k)=Hs(k)+n(k). In this case, the genetic algorithm-based channel estimation method includes the following steps.

Step 1: Parameter setting.

Set a maximum quantity $N_g$ of iterations of outer loop, a maximum quantity $N_b$ of iterations of inner loop, and a population quantity $P_S$. An outer loop index g is initially set to 0.

Step 2: Initialization.

Step 2.1: Set the outer loop index g to g+1 and an inner loop index t to 0. (This step is not shown in the figure.)

Step 2.2: If g=1, randomly generate $P_S$ sample channel matrices $H_i^{(g)}$, where $1 \leq i \leq P_S$. A weighting facto $$\delta_i(0) = \frac{1}{P_S}, 1 \leq i \leq P_S$$

corresponding to each sample channel matrix $H_i^{(g)}$ is initialized.

If g>1, Ps−1 sample channel matrices $H_i^{(g)}$ are randomly generated, where $1 \le i \le P_S-1$. The Ps$^{th}$ sample channel matrix $H_{P_S}^{(g)}$ is a sample channel matrix having a smallest cost function value in Ps sample channel matrices after previous outer loop ends, that is, $H_{P_S}^{(g)} = H_{best}^{(g-1)}$.

Step 2.3: For the i$^{th}$ sample channel matrix $H_i^{(g)}$, estimate a sent symbol vector $s_i^{(g)}$ by using a MIMO detection algorithm. The MIMO detection algorithm may be one of common MIMO detection algorithms, such as maximum likelihood (ML) detection, MMSE detection, and sphere decoding.

Step 2.4: For the i$^{th}$ sample channel matrix $H_i^{(g)}$ and a MIMO detection result $s_i^{(g)}$ corresponding to the i$^{th}$ sample channel matrix, calculate a cost function value corresponding to the i$^{th}$ sample channel matrix:

$$J_i = J(H_i^{(g)}) = \frac{1}{KN_R} \sum_{k=1}^{K} |y(k) - H_i^{(g)} s_i^{(g)}(k)|^2 \quad (3)$$

$N_R$ is a quantity of antennas at a receive end.

Step 3: Inner iteration.

Step 3.1: Search for the sample channel matrix having the smallest cost function (namely, an optimal sample channel matrix) and a sample channel matrix having a largest cost function (namely, a worst sample channel matrix) in the Ps sample channel matrices, which are denoted as:

$$H_{best}^{(g)} = \operatorname{argmin}_{H_i^{(g)}, 1 \le i \le P_S} J_i,$$

$$H_{worst}^{(g)} = \operatorname{argmax}_{H_i^{(g)}, 1 \le i \le P_S} J_i.$$

Step 3.2: Update a weighting factor. Specifically, for the i$^{th}$ sample, a factor $$\beta_t = \frac{\eta_t}{1 - \eta_t}$$

is calculated and updated, where $$\eta_t = \sum_{i=1}^{P_S} \delta_i(t-1) \overline{J}_i, \text{ and}$$

$$\overline{J}_i = \frac{J_i}{\sum_{j=1}^{P_S} J_j}, 1 \le i \le P_S.$$

The weighting factor is then calculated, updated, and normalized according to the following formula:

$$\delta_i(t) = \begin{cases} \delta_i(t-1)\beta_t^{\overline{J}_i}, & \text{for } \beta_t \le 1 \\ \delta_i(t-1)\beta_t^{1-\overline{J}_i}, & \text{for } \beta_t > 1 \end{cases}$$

$$\delta_i(t) = \frac{\delta_i(t)}{\sum_{j=1}^{P_S} \delta_j(t)}, 1 \le i \le P_S$$

Step 3.3: Calculate the $P_S+1^{th}$ sample channel matrix $H_{P_S+1} = \sum_{i=1}^{P_S} \delta_i(t) H_i^{(g)}$ and the $P_S+2^{th}$ sample channel matrix $H_{P_S+2} = H_{best}^{(g)} + (H_{best}^{(g)} - H_{P_S+1})$, and obtain corresponding transmitted symbol vectors $s_{P_S+1}^{(g)}$ and $s_{P_S+2}^{(g)}$ through MIMO detection.

Step 3.4: Calculate corresponding cost function values $J_{P_S+1} = J(H_{P_S+1}^{(g)})$ and $J_{P_S+2} = J(H_{P_S+2}^{(g)})$ according to formula (3), to obtain a channel matrix having a smaller cost function value in the two cost function values (namely. $H_{P_S+1}$ or $H_{P_S+2}$), and replace the sample channel matrix having the largest cost function value in the $P_S$ sample channel matrices with the channel matrix having the smaller cost function value.

Step 3.5: If $H_{P_S+1}$ is close to $H_{P_S+2}$, that is, $|H_{P_S+1} - H_{P_S+2}| < \varepsilon$, end the current inner loop in advance, and go to step 4.

If $|H_{P_S+1} - H_{P_S+2}| \ge \varepsilon$, the inner loop index t=t+1. Whether a quantity of inner iterations reaches the maximum quantity of inner iterations, that is, whether $t=N_b$, is determined. If $t<N_b$, the process returns to step 3.1; otherwise, the process goes to step 4.

Step 4: End determining and output a result.

Whether a quantity of outer iterations reaches the maximum quantity of outer iterations is determined, that is, whether $g=N_g$, is determined. If $g<N_g$, the process returns to step 2; otherwise, a sample channel matrix $H_{best}^{(N_G)}$ currently having the smallest cost function value is output as a final channel estimation result.

The inventor finds that, in the foregoing channel estimation method, the following problems may further be improved.

Problem 1: In the channel estimation method shown in FIG. 3A and FIG. 3B, a channel estimation result that is close to an optimal channel estimation result is obtained based on inner iteration and outer iteration. It is found through testing that the blind channel estimation algorithm shown in FIG. 3A and FIG. 3B usually requires a large quantity of outer iterations and a large quantity of inner iterations. To ensure convergence of the estimation result, thousands of iterations are usually required. This causes extremely high calculation complexity and an extremely great calculation delay, making it difficult to apply a blind estimation algorithm shown in FIG. 3A and FIG. 3B to an actual communication system.

Problem 2: Because the blind channel estimation method does not depend on a reference signal for channel estimation, a design of the reference signal may not be demanding. For example, a large quantity of DMRS resources currently defined in NR are redundant for the channel estimation method, so that DMRS overheads can be reduced or even no DMRS is required. In addition, the design of the reference signal does not require orthogonalization, either. To maximally improve system spectrum efficiency and fully make use of the blind estimation algorithm, the reference signal needs to be specially designed.

Figure 4:
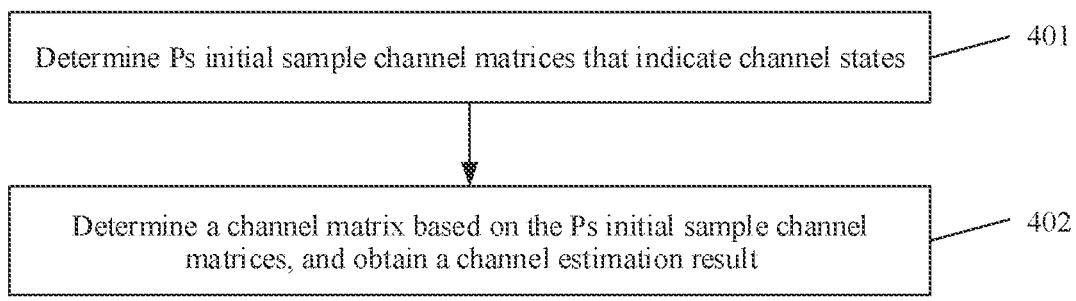
FIG. 4 is a flowchart of a channel estimation method according to this application.

To resolve the foregoing problem (1), this application provides a channel estimation method. This method is mainly used to improve the initialization part in the channel estimation method shown in FIG. 3A and FIG. 3B. FIG. 4 shows a channel estimation method provided in this application. The method may be performed by a terminal device, a chip used in the terminal device, a network device, or a chip used in the network device.

The method includes the following steps.

Step 401: Determine Ps initial sample channel matrices that indicate channel states, where the Ps initial sample channel matrices include P1 first sample channel matrices and Ps-P1 second sample channel matrices, the P1 first sample channel matrices are determined based on a previous sample channel matrix or a given reference signal. Ps is an integer greater than 1, and P1 is a positive integer less than or equal to Ps.

Herein, the previous sample channel matrix may be an estimated channel matrix obtained by performing channel estimation based on a preset or preconfigured reference signal at a historical moment. A time domain resource and a frequency domain resource that correspond to the preset or preconfigured reference signal at the historical moment are consistent with a time domain resource and a frequency domain resource that correspond to a current to-be-estimated channel matrix. The previous sample channel matrix herein may alternatively be a sample channel matrix in a process of performing the channel estimation method in this application at the historical moment.

The given reference signal may be a reference signal resource associated with current channel measurement, and the reference signal resource may be a reference signal resource configured by the network device. In the current channel estimation, measurement and processing need to be performed based on the reference signal resource.

Step 402: Determine a channel matrix based on the Ps initial sample channel matrices, and obtain a channel estimation result.

In comparison with the method shown in FIG. 3A and FIG. 3B that the Ps initial sample channel matrices are randomly generated, in this solution of this application, the P1 initial sample channel matrices (namely, the P1 first sample channel matrices) in the Ps initial sample channel matrices are determined based on the previous sample channel matrix or the given reference signal. Therefore, an initial channel estimation result may be provided as an iterative initial sample channel matrix. After iteration processing is performed on the initial sample channel matrices, a final channel matrix may be determined, to obtain a signal estimation result. Based on this, a channel estimation result close to an optimal result can be quickly obtained. This can accelerate optimization convergence, reduce computational complexity, improve accuracy of the channel estimation result, and increase a speed of obtaining the channel estimation result.

In an implementation, other Ps-P1 initial sample channel matrices (namely, the Ps-P1 second sample channel matrices) in the Ps initial sample channel matrices may be generated according to any one of the following methods.

Method 1: Use a sum of any one of the P1 first sample channel matrices and a first perturbation matrix as one or more of the Ps-P1 second sample channel matrices, where each element in the first perturbation matrix is a complex-valued Gaussian random variable whose average value is 0 and variance is $\sigma^2$.

In other words, in this method, one or more (Ps-P1 at most) second sample channel matrices may be generated based on one first sample channel matrix and the first perturbation matrix.

Based on this method, a plurality of sample points (namely, initial sample channel matrices) may be generated around rough estimation by superimposing small Gaussian random variables, to improve accuracy of an initialization sample, accelerate optimization convergence, and reduce calculation complexity and a calculation delay.

In an implementation, the variance $\sigma^2$ corresponding to each element in the generated first perturbation matrix may be equal to a noise variance corresponding to a current signal-to-noise ratio (SNR), or equal to a product of a noise variance corresponding to a current SNR and a weighting coefficient, where the weighting coefficient is a real number greater than 0. In an implementation, the weighting coefficient may be ½. For an additive white Gaussian noise, the noise variance is equal to a power spectral density $N_0$ of the additive white Gaussian noise.

In another implementation, the variance $\sigma^2$ corresponding to each element in the generated first perturbation matrix may be equal to an equivalent noise variance corresponding to a current receive end signal to interference plus noise ratio (SINR), or equal to a product of an equivalent noise variance corresponding to a current receive end SINR and a weighting coefficient, where the weighting coefficient is a real number greater than 0.

Method 2: Generate at least one of the Ps-P1 second sample channel matrices based on a preset random algorithm.

In other words, in this method, one or more (Ps-P1 at most) second sample channel matrices are generated based on the random algorithm. The preset random algorithm may be that a real part or an imaginary part of each element in the second sample channel matrix is a random variable that follows uniform distribution and that is in a preset value range, or may be that a real part or an imaginary part of each element in the second sample channel matrix is a random variable that follows Gaussian distribution and that is in a preset value range. This is merely used as an example herein. During actual application, distribution that the real part or the imaginary part of each element in the second sample channel matrix follows is not limited to this distribution manner.

Alternatively, an amplitude value or a phase value of each element in the second sample channel matrix is a random variable that follows uniform distribution and that is in a preset value range, or an amplitude value or a phase value of each element in the second sample channel matrix is a random variable that follows Gaussian distribution and that is in a preset value range. This is merely used as an example herein. During actual application, distribution that the amplitude or the phase of each element in the second sample channel matrix follows is not limited to this distribution manner. It should be noted that the foregoing method 1 and the method 2 may be used in combination. To be specific, a part of the second sample channel matrices are generated by using the method 1, and a part of the second sample channel matrices are generated by using the method 2.

Method 3: Obtain at least one of the Ps-P1 second sample channel matrices by performing channel estimation based on the at least one group of signal detection results in the plurality of groups of signal detection results, where the plurality of groups of signal detection results are obtained by grouping the data signal detection results, and the data signal detection results are obtained by detecting the data signal by using any one of the P1 first sample channel matrices.

To be specific, the data signal is detected by using any one of the P1 first sample channel matrices, to obtain the data signal detection results: the data signal detection results are grouped to obtain the plurality of groups of signal detection results; and channel estimation is performed on the at least one group of signal detection results in the plurality of groups of signal detection results, to obtain the at least one of the Ps-P1 second sample channel matrices.

In this method. MIMO detection is performed based on one first sample channel matrix, to obtain estimation results of a transmitted signal corresponding to the first sample channel matrix. A used MIMO detection algorithm may be an ML detection algorithm, a sphere decoding algorithm, an MMSE detection algorithm, a zero forcing (ZF) detection algorithm, or another algorithm. Further, the estimation results of the transmitted signals corresponding to the first sample channel matrix are grouped to obtain a plurality of groups of signal detection results. Channel estimation is performed based on the at least one group of signal detection results in the plurality of groups of signal detection results, to obtain at least one estimated channel matrix as at least one of the Ps-P1 second sample channel matrices.

For an implementation for grouping the data signal detection results in this solution, refer to a grouping manner described in step 502 in the following Embodiment in the FIG. 5. Details are not described.

According to this solution, the initial channel estimation result may be obtained based on the preset reference signal. The initial estimation result of the data signal may be obtained based on the channel estimation result. In the foregoing solution, the initial data signal detection results are effectively used in an initialization algorithm of iterative channel estimation. The data signal detection results corresponding to the channel estimation results obtained based on the reference signal are grouped, and channel estimation is separately performed on each group of data signal detection results as an initial candidate value of initial iteration. A channel estimation result close to an optimal estimation result can be quickly obtained, thereby avoiding blindly selecting an initialized channel matrix in the initial iteration.

In an implementation, a specific implementation process of the foregoing step 402 may be the same as a corresponding process of the channel estimation method shown in FIG. 3A and FIG. 3B. Refer to the foregoing descriptions.

In an implementation, if the solution of the embodiment in FIG. 4 is applied to the process shown in FIG. 3A and FIG. 3B, "If g=1, randomly generate $P_S$ sample channel matrices $H_i^{(g)}$, where $1 \leq i \leq P_S$." in 2.2 of step 2 in the process shown in FIG. 3A and FIG. 3B may be modified to "Determine Ps initial sample channel matrices that indicate channel states, where the Ps initial sample channel matrices include P1 first sample channel matrices and Ps-P1 second sample channel matrices, the P1 first sample channel matrices are determined based on a previous sample channel matrix or a given reference signal, Ps is an integer greater than 1, and P1 is a positive integer less than or equal to Ps, where at least one of the Ps-P1 second sample channel matrices is a sum of any one of the P1 first sample channel matrices and a first perturbation matrix, and each element in the first perturbation matrix is a complex-valued Gaussian random variable whose average value is 0 and variance is $\sigma^2$; or at least one of the Ps-P1 second sample channel matrices is generated based on a preset random algorithm." Alternatively, at least one of the Ps-P1 second sample channel matrices is obtained by performing channel estimation based on the at least one group of signal detection results in the plurality of groups of signal detection results, where the plurality of groups of signal detection results are obtained by grouping the data signal detection results, and the data signal detection results are obtained by detecting the data signal by using any one of the P1 first sample channel matrices.

This application provides another channel estimation method. This method is mainly used to improve the outer loop iteration part of the channel estimation method shown in FIG. 3A and FIG. 3B. FIG. 5 shows a channel estimation method provided in this application. The method includes the following steps: obtaining a channel matrix by processing a data signal and a sample channel matrix for N times. In this embodiment, the N times of processing are also referred to as N times of iteration processing, where N is a positive integer. Single-time processing or single-time iteration processing includes the following steps.

Step 501: Detect the data signal by using third sample channel matrices, to obtain data signal detection results.

Step 502: Group the data signal detection results, to obtain a plurality of groups of signal detection results.

Herein, the data signal is a channel or signal that does not include a reference signal. For example, the data signal may be control channel information that does not include a reference signal, for example, a physical uplink control channel (PUCCH) or a physical downlink control channel (PDCCH). Alternatively, the data signal may be data channel information that does not include a reference signal, for example, a physical uplink shared channel (PUSCH) or a physical downlink shared channel (PDSCH).

It is assumed that the obtained data signal detection results include N symbol vectors, and each symbol vector is an R*1 column vector, where R represents a quantity of transmit antenna ports or a quantity of spatial layers. The N symbol vectors may correspond to a plurality of time domain resources and/or a plurality of frequency domain resources. That the data signal detection results are divided into X groups indicates that the N symbol vectors are divided into X groups, where each group include $$\left\lceil \frac{N}{X} \right\rceil$$

symbol vectors or $$\left\lfloor \frac{N}{X} \right\rfloor$$

symbol vectors. A grouping manner herein includes but is not limited to:

Method 1: For the time-frequency resources corresponding to the data signal, detection results that correspond to a plurality of consecutive time-frequency resources and that are in the data signal detection results are grouped into one group first based on frequency domain and then based on time domain. Alternatively, detection results that correspond to a plurality of consecutive time-frequency resources and that are in the data signal detection results may be grouped into one group first based on time domain and then based on frequency domain.

For example, the obtained data signal detection results include N=336 symbol vectors, and correspondingly occupied time-frequency resources are two resource blocks (RBs), namely, 24 subcarriers, in frequency domain in total, and 14 OFDM symbols in time domain in total. When the data signal detection results are grouped, data signal detection results corresponding to a time-frequency resource including 24 subcarriers of the first OFDM symbol and 24 subcarriers of the second OFDM symbol may be grouped into a first group, and data signal detection results corresponding to a time-frequency resource including 24 subcarriers of the third OFDM symbol and 24 subcarriers of the fourth OFDM symbol may be grouped into the first group. By analogy, seven groups may be obtained, and each group includes 28 symbol vectors.

Method 2: For the time-frequency resources corresponding to the data signal, the data signal detection results are grouped in a time-frequency resource discrete manner. Data signal detection results corresponding to time-frequency resources whose time domain interval is a preset time domain length or whose frequency domain interval is a preset frequency domain length may be grouped into a first group. The time domain length may be an OFDM symbol or a slot, and the frequency domain length may be one or more subcarriers or RBs.

A manner of grouping the data signal detection results is not limited to the foregoing method 1 and the method 2, and another grouping manner and another grouping criterion may alternatively be used. For example, grouping may be performed in ascending or descending order of absolute values of likelihood ratios or log-likelihood ratios corresponding to the data signal detection results. To be specific, the data signal detection results are sorted in ascending or descending order of absolute values of the likelihood ratios or the log-likelihood ratios, and one or more adjacent data signal detection results are grouped into one group.

In the foregoing implementation, the data signal detection results are grouped to obtain the plurality of groups of signal detection results. In another implementation, the data signal detection results and the reference signals may be grouped to obtain a plurality of groups of signal detection results, that is, each group may include both a data signal and a reference signal. The reference signal may be considered as a signal of a known transmit symbol. One group of detected signals in the plurality of groups of signal detection results obtained by grouping the data signal detection results and a part or all of the reference signals form a group of signals.

Step 503: Perform channel estimation based on at least one group of signal detection results in the plurality of groups of signal detection results, to obtain at least one estimated channel matrix.

The estimated channel matrix herein is an estimation result that is of the channel matrix and that is obtained by performing channel estimation processing based on the at least one group of signal detection results in the plurality of groups of signal detection results. A used channel estimation algorithm may be an LS channel estimation algorithm, an MMSE channel estimation algorithm, or the like. In a previous iteration processing process, based on a linear combination of the sample channel matrix, a more accurate channel matrix estimation result may further be generated, or a channel matrix estimation result having a better cost function may be generated. Correspondingly, a signal detection result corresponding to the more accurate channel matrix estimation result or the channel matrix estimation result having the better cost function is more accurate, that is, an error probability is lower. MIMO detection is performed on the data signal based on the optimal channel estimation result that is output in the previous iteration processing, to obtain corresponding signal detection results. A plurality of data signal blocks whose error probabilities are not completely the same may be obtained by grouping the signal detection results. Each of the plurality of data signal blocks is considered as a reference signal, so that a more accurate channel estimation result can be obtained. If the current iteration processing is not the last iteration processing, the channel estimation result corresponding to the at least one group of signal detection results in the plurality of signal detection results is used as an input sample channel matrix in next iteration processing. That is, the estimated channel matrix obtained in the current iteration processing is used as an input sample channel matrix in the next iteration processing, so that a channel estimation result close to a better channel estimation result can be quickly obtained. This accelerates a convergence process of channel estimation. If the current iteration processing is the $N^{th}$ time of iteration processing, namely, the last iteration processing, the estimated channel matrix obtained in the current iteration processing is a final channel matrix. That is, the channel estimation result is obtained.

In comparison with the method shown in FIG. 3A and FIG. 3B that only one sample channel matrix in the previous outer loop iteration is reserved in the outer loop iteration, in comparison, in the foregoing solution in this embodiment, the data signal detection results are effectively used. The data signal detection results are grouped, and channel estimation is separately performed on each group of data signal detection results as an initial candidate sample channel matrix of next iteration processing. Each data signal detection result has a different detection accuracy rate, and a channel estimation result corresponding to a signal block having a higher detection accuracy rate has a better cost function value in next iteration processing, and has a greater contribution effect when a new sample channel matrix is formed. Therefore, this solution provides an effective iterative detection convergence direction. A benign cycle is formed through data signal detection, convergence is fast, and calculation complexity and a calculation delay are effectively reduced.

The foregoing solution is used for outer loop iteration in a case in which g>1, and does not include a case in which g=1. In addition, in the current iteration, one or more of the obtained at least one estimated channel matrix may be used as an input of the inner iteration processing corresponding to the current outer iteration processing. In addition, one or more of the obtained at least one estimated channel matrix may be used as an input of next outer iteration processing, to continue to perform next outer iteration processing.

A third sample channel matrix used in the first time of processing in the N times of processing is a channel matrix having an optimal cost function value in Ps initial sample channel matrices on which processing is performed.

In an implementation, the Ps initial sample channel matrices include P1 first sample channel matrices and Ps-P1 second sample channel matrices, the P1 first sample channel matrices are determined based on a previous sample channel matrix or a given reference signal, Ps is an integer greater than 1, and P1 is a positive integer less than or equal to Ps.

Optionally, at least one of the Ps-P1 second sample channel matrices is a sum of any one of the P1 first sample channel matrices and a first perturbation matrix, and each element in the first perturbation matrix is a complex-valued Gaussian random variable whose average value is 0 and variance is $\sigma^2$.

Optionally, at least one of the Ps-P1 second sample channel matrices is obtained by performing channel estimation based on the at least one group of signal detection results in the plurality of groups of signal detection results, where the plurality of groups of signal detection results are obtained by grouping the data signal detection results, and the data signal detection results are obtained by detecting the data signal by using any one of the P1 first sample channel matrices.

Optionally, at least one of the Ps-P1 second sample channel matrices is generated based on a preset random algorithm.

In still another implementation, the Ps initial sample channel matrices are randomly generated sample channel matrices.

A third sample channel matrix used in the second time of iteration processing in the N times of iteration processing and a time of iteration processing after the second time of iteration processing is a channel matrix having an optimal cost function value that is after previous outer loop iteration ends. Alternatively, it may be understood as that a third sample channel matrix used in processing other than the first time of processing in the N times of processing is a channel matrix having an optimal cost function value.

The optimal cost function value is used to reflect a channel estimation result and/or a signal detection result that is closest to an ideal or optimal channel estimation or signal detection result. Alternatively, the optimal cost function value is used to reflect a channel estimation result and/or a signal detection result that is closest to an actual accurate channel matrix and/or transmitted symbol vector. The cost function may be one of a plurality of measurement indicators. Accordingly, based on different cost functions, the optimal cost function value may be a smallest cost function value or a largest cost function value.

In an implementation, the cost function may be the cost function shown in the foregoing formula (1) or formula (2). In this case, the smallest cost function value indicates the optimal cost function value.

In another implementation, the cost function may alternatively be an error probability (for example, a symbol error rate (SER), a bit error rate (BER), a block error rate (BLER), or a frame error rate (FER)) corresponding to the signal detection result. In this case, the smallest cost function value indicates the optimal cost function value. The smallest cost function value indicates a smallest error probability corresponding to the signal detection result.

In another implementation, the cost function may alternatively be a correctness probability corresponding to the signal detection result. In this case, the largest cost function value indicates the optimal cost function value. The largest cost function value indicates the largest correctness probability corresponding to the signal detection result.

In another implementation, the cost function may alternatively be a system capacity or a system throughput corresponding to the signal detection result. In this case, the largest cost function value indicates the optimal cost function value.

In another implementation, the cost function may alternatively be a reciprocal of the foregoing formula (1) or formula (2). In this case, the largest cost function value indicates the optimal cost function value.

In an implementation, the channel matrix having the optimal cost function value is obtained by processing a plurality of fourth sample channel matrices, and the plurality of fourth sample channel matrices include at least one of the estimated channel matrices, that is, include at least one estimated channel matrix obtained by performing channel estimation on packet data.

In an implementation, the plurality of fourth sample channel matrices further include a randomly generated sample channel matrix. To be specific, except at least one estimated channel matrix obtained by performing channel estimation on the packet data, the remaining channel matrices are randomly generated.

In still another implementation, at least one of the plurality of fourth sample channel matrices is a sum of the third sample channel matrix and a second perturbation matrix, and each element in the second perturbation matrix is a complex-valued Gaussian random variable whose average value is 0 and variance is $\sigma^2$. To be specific, except at least one estimated channel matrix obtained by performing channel estimation on the packet data, the remaining channel matrices are the sum of the third sample channel matrix and the perturbation matrix.

In an implementation, the variance $\sigma^2$ corresponding to each element in the generated first perturbation matrix may be equal to a noise variance corresponding to a current signal-to-noise ratio SNR, or equal to a product of a noise variance corresponding to a current SNR and a weighting coefficient, where the weighting coefficient is a real number greater than 0. In an implementation, the weighting coefficient may be ½. For an additive white Gaussian noise, the noise variance is equal to a power spectral density No of the additive white Gaussian noise.

In another implementation, the variance $\sigma^2$ corresponding to each element in the generated first perturbation matrix may be equal to an equivalent noise variance corresponding to a current receive end signal to interference plus noise ratio (SINR), or equal to a product of an equivalent noise variance corresponding to a current receive end SINR and a weighting coefficient, where the weighting coefficient is a real number greater than 0.

In still another implementation, at least one of the plurality of fourth sample channel matrices is determined based on a previous sample channel matrix or a given reference signal. Alternatively, at least one of the plurality of fourth sample channel matrices is a sum of a previous sample signal matrix and a perturbation matrix, and each element in the perturbation matrix is a complex-valued Gaussian random variable whose average value is 0 and variance is $\sigma^2$. For details, refer to the related descriptions in step 401. Details are not described herein again.

In an implementation, the channel estimation method includes a two-level iteration processing process. Outer iteration provides an initialized sample channel matrix $H_i^{(g)}$ for inner iteration, where $1 \leq i \leq P_S - 1$. The initialized sample channel matrix may be one or more of the first sample channel matrix, the second sample channel matrix, the third sample channel matrix, or the fourth sample channel matrix. In the inner iteration, MIMO detection is first performed on each sample channel matrix $H_i^{(g)}$ in the initialized sample channel matrix $H_i^{(g)}$ provided by an outer layer, to obtain an estimation result $s_i^{(g)}$ of a corresponding transmitted signal. Second, a cost function value corresponding to the sample channel matrix is calculated based on the sample channel matrix $H_i^{(g)}$ and the estimation result $s_i^{(g)}$ of the corresponding transmitted signal. Then, a weighting coefficient corresponding to the sample channel matrix is calculated based on the cost function value corresponding to the sample channel matrix. The cost function value is inversely proportional to the weighting coefficient corresponding to the sample channel matrix. To be specific, the larger the cost function value corresponding to the sample channel matrix is, the smaller the weighting coefficient value corresponding to the sample channel matrix is. A smaller cost function value corresponding to the sample channel matrix indicates a larger the weighting coefficient value corresponding to the sample channel matrix. Then, linear weighting is performed on all $P_S$ sample channel matrices, to obtain at least one new sample channel matrix. The linear weighting process may be the method described in step 3.3 in the procedure shown in FIG. 3A and FIG. 3B. A cost function value corresponding to the at least one new sample channel matrix is calculated. If the cost function value corresponding to the at least one new sample channel matrix is better than the worst cost function value corresponding to the $P_S$ sample channel matrices, a sample channel matrix having the worst cost function value in the $P_S$ sample channel matrices is replaced with the new sample channel matrix. Specifically, when the solution in the embodiment in FIG. 5 is applied to the procedure shown in FIG. 3A and FIG. 3B, "If g>1, $P_S-1$ sample channel matrices $H_i^{(g)}$ are randomly generated, where $1 \leq i \leq P_S - 1$. The $Ps^{th}$ sample channel matrix $H_{P_S}^{(g)}$ is a sample channel matrix having a smallest cost function value in Ps sample channel matrices that is after previous outer loop ends, that is, $H_{P_s}^{(g)}=H_{best}^{(g-1)}$." in step 2.2 in the procedure shown in FIG. 3A and FIG. 3B may be modified to "If g>1, one of Ps sample channel matrices may be a sample channel matrix having a smallest cost function value in Ps sample channel matrices that is after previous outer loop ends, that is, $H_{best}^{(g-1)}$. K transmitted symbol vectors $s_{best}^{(g-1)}$ are estimated through MIMO detection by using the channel matrix $H_{best}^{(g-1)}$. The K transmitted symbol vectors $s_{best}^{(g-1)}$ are divided into Ps-X symbol vector groups, where a channel matrix $\hat{H}_l$ corresponding to all symbol vectors in the $l^{th}$ symbol vector group is estimated by using the LS channel estimation algorithm and is used as the $l^{th}$ sample channel matrix $H_l^{(g)}=\hat{H}_l$. Other X–1 sample channel matrices may be randomly generated or may be a sum of a channel sample matrix in the Ps-X sample channel matrices and a second perturbation matrix, and each element in the second perturbation matrix is a complex-valued Gaussian random variable whose average value is 0 and variance is $\sigma^2$."

Figure 5:
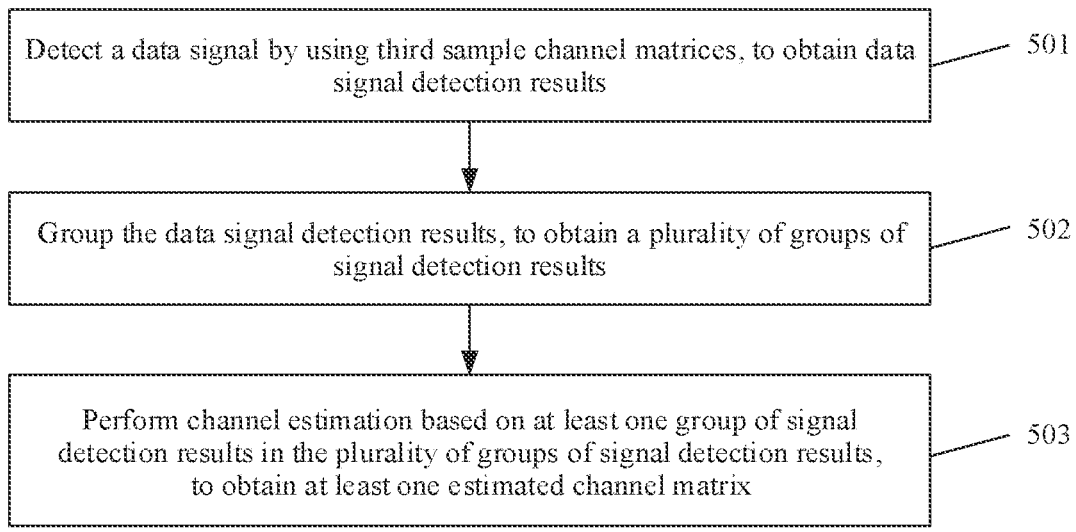
FIG. 5 is a flowchart of another channel estimation method according to this application.

In this example, "K transmitted symbol vectors $s_{best}^{(g-1)}$ are estimated through MIMO detection by using the channel matrix $H_{best}^{(g-1)}$" is a specific implementation of "Detect the data signal by using third sample channel matrices, to obtain data signal detection results" in the embodiment in FIG. 5. That is, the data signal detection result is the K transmitted symbol vectors $s_{best}^{(g-1)}$.

In this example, "The K transmitted symbol vectors $s_{best}^{(g-1)}$ are divided into Ps-X symbol vector groups" is a specific implementation of "Group the data signal detection results, to obtain a plurality of groups of signal detection results" in the embodiment in FIG. 5.

In this example, "a channel matrix $\hat{H}_l$ corresponding to all symbol vectors in the $l^{th}$ symbol vector group is estimated by using the LS channel estimation algorithm and is used as the $l^{th}$ sample channel matrix $H_l^{(g)}=\hat{H}_1$" is a specific implementation of "Perform channel estimation based on at least one group of signal detection results in the plurality of groups of signal detection results, to obtain at least one estimated channel matrix" in the embodiment in FIG. 5.

It should be noted that the embodiment in FIG. 4 and the embodiment in FIG. 5 may be implemented separately, or may be implemented in combination. When the two embodiments are implemented in combination, the following provides an improved solution for the embodiment shown in FIG. 3A and FIG. 3B.

Figure 6A:
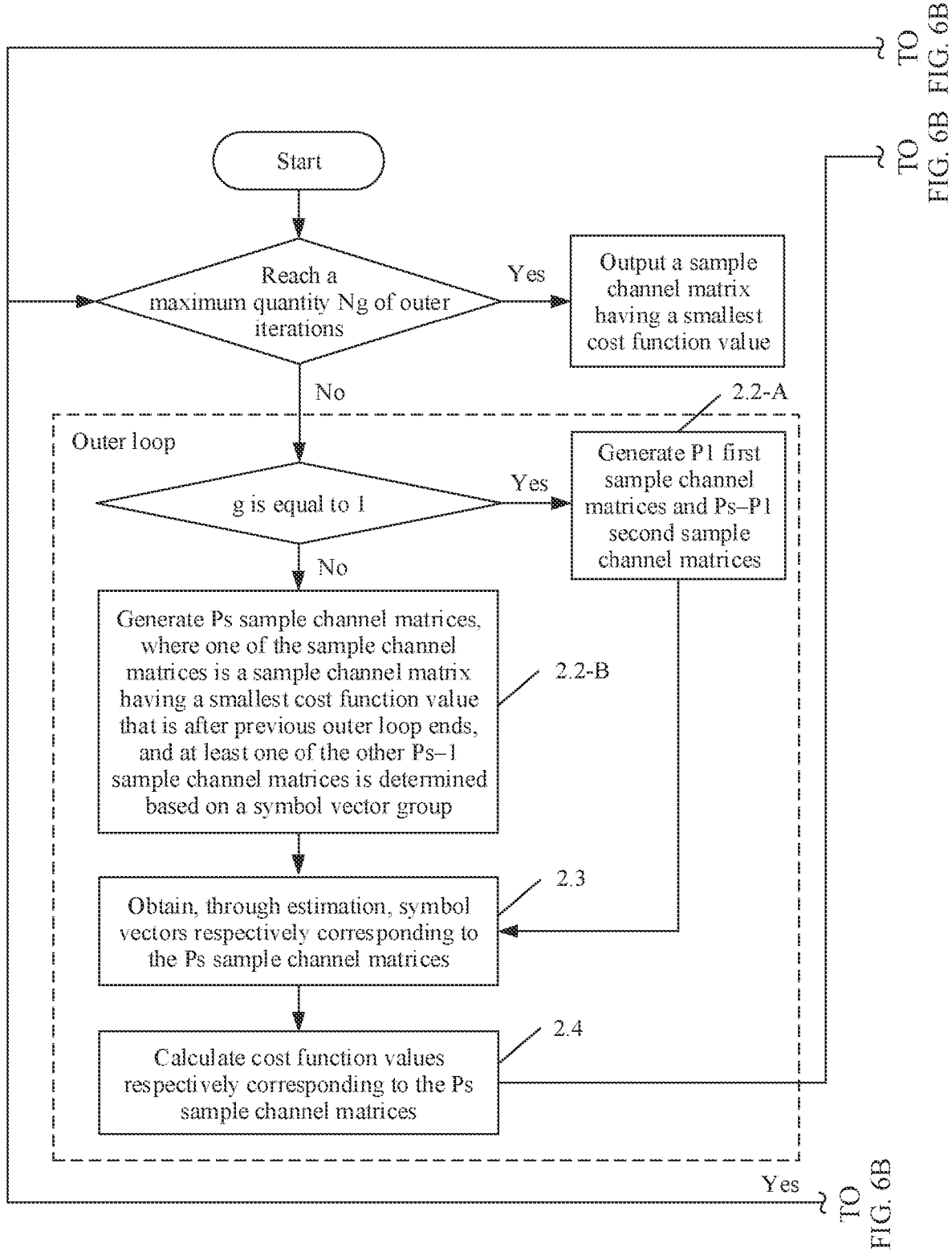
FIG. 6A and FIG. 6B are a flowchart of another channel estimation method according to this application.
Figure 6B:
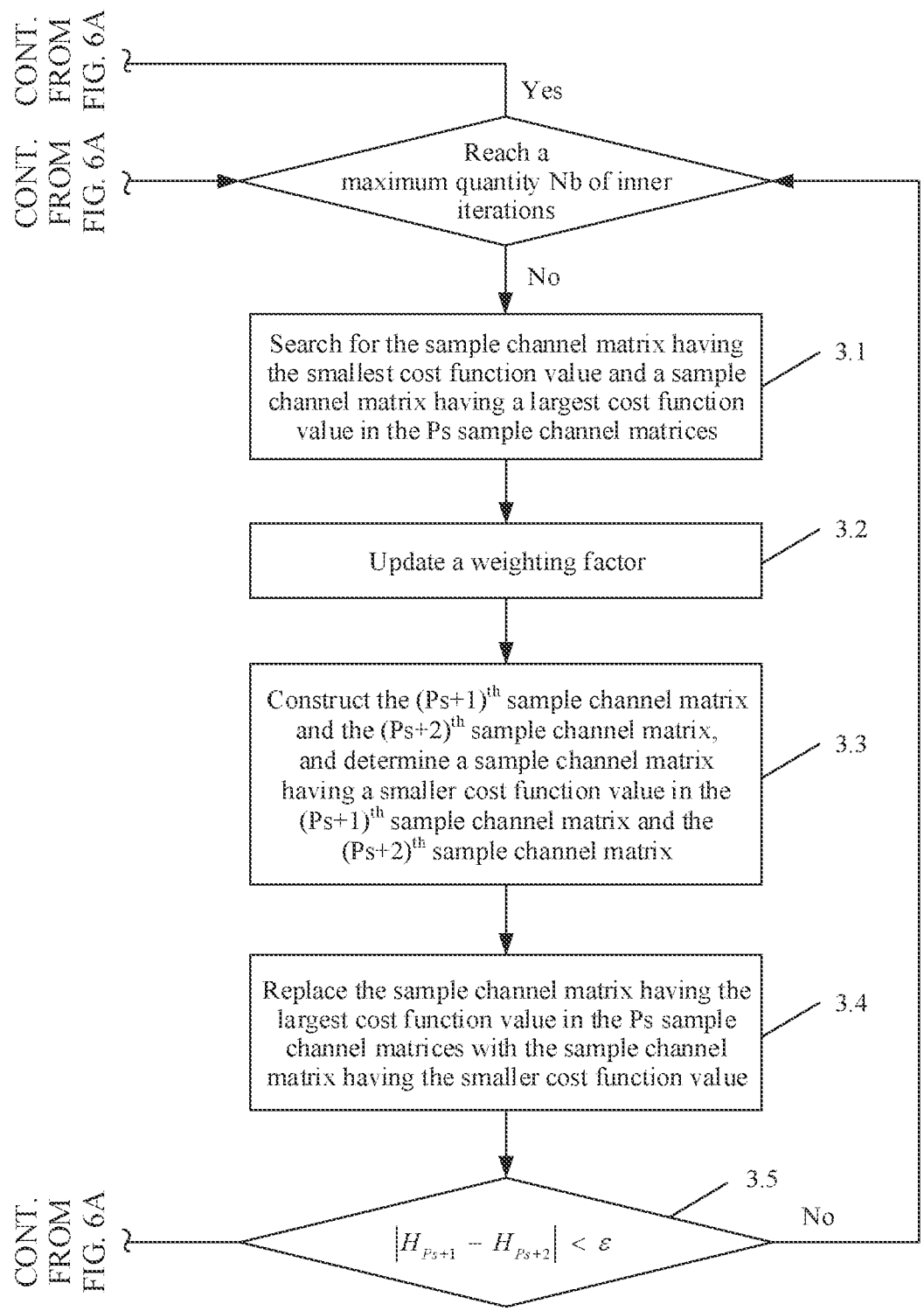

FIG. 6A and FIG. 6B are a flowchart of a genetic algorithm-based channel estimation method according to this application. It is assumed that, for K transmitted symbol vectors, a channel matrix H remains unchanged. For the kA receive symbol vector, y(k)=Hs(k)+n(k). In this case, the genetic algorithm-based channel estimation method includes the following steps.

Step 1: Parameter setting.

Set a maximum quantity $N_g$ of iterations of outer loop, a maximum quantity of iterations $N_b$ of inner loop, and a population quantity $P_S$. An outer loop index g is initially set to 0.

Step 2: Initialization.

Step 2.1: Set the outer loop index g to g+1 and an inner loop index t to 0.

Step 2.2: Initialize a sample channel matrix:

A. If g=1, determine Ps initial sample channel matrices $H_i^{(g)}$ that indicate channel states, where $1 \le i \le P_S$, where the Ps initial sample channel matrices include P1 first sample channel matrices and Ps-P1 second sample channel matrices, the P1 first sample channel matrices are determined based on a previous sample channel matrix or a given reference signal, Ps is an integer greater than 1, and P1 is a positive integer less than or equal to Ps, where at least one of the Ps-P1 second sample channel matrices is a sum of any one of the P1 first sample channel matrices and a first perturbation matrix, and each element in the first perturbation matrix is a complex-valued Gaussian random variable whose average value is 0 and variance is $\sigma^2$; or at least one of the Ps-P1 second sample channel matrices is generated based on a preset random algorithm. Alternatively, at least one of the Ps-P1 second sample channel matrices is obtained by performing channel estimation based on the at least one group of signal detection results in the plurality of groups of signal detection results, where the plurality of groups of signal detection results are obtained by grouping the data signal detection results, and the data signal detection results are obtained by detecting the data signal by using any one of the P1 first sample channel matrices.

A weighting factor $$\delta_i(0) = \frac{1}{P_S}, 1 \le i \le P_S$$

corresponding to each sample channel matrix $H_i^{(g)}$ is initialized.

B. If g>1, one of the Ps sample channel matrices may be a sample channel matrix having a smallest cost function value in the Ps sample channel matrices after previous outer loop ends, that is, $H_{best}^{(g-1)}$. K transmitted symbol vectors $s_{best}^{(g-1)}$ are estimated through MIMO detection by using the channel matrix $H_{best}^{(g-1)}$. The K transmitted symbol vectors $s_{best}^{(g-1)}$ are divided into Ps-X symbol vector groups, where a channel matrix R, corresponding to all symbol vectors in the $l^{th}$ symbol vector group is estimated by using the LS channel estimation algorithm and is used as the $l^{th}$ sample channel matrix $H_l^{(g)}=\hat{H}_l$. Other X–1 sample channel matrices may be randomly generated or may be a sum of a channel sample matrix in the Ps-X sample channel matrices and a second perturbation matrix, and each element in the second perturbation matrix is a complex-valued Gaussian random variable whose average value is 0 and variance is $\sigma^2$. That is, at least one of other Ps-1 sample channel matrices is determined based on a symbol vector group, and the symbol vector group is related to the sample channel matrix having the smallest cost function value after the previous outer loop ends.

A weighting factor $$\delta_i(0) = \frac{1}{P_S}, 1 \le i \le P_S$$

corresponding to each sample channel matrix $H_i^{(g)}$ is initialized.

Step 2.3: For the $i^{th}$ sample channel matrix $H_i^{(g)}$, estimate a sent symbol vector $s_i^{(g)}$ by using a MIMO detection algorithm. The MIMO detection algorithm may be one of common MIMO detection algorithms, such as maximum likelihood detection, MMSE detection, and sphere decoding.

Step 2.4: For the $i^{th}$ sample channel matrix $H_i^{(g)}$ and a MIMO detection result $s_i^{(g)}$ corresponding to the $i^{th}$ sample channel matrix, calculate a cost function value corresponding to the $i^{th}$ sample channel matrix:

$$J_i = J(H_i^{(g)}) = \frac{1}{KN_R} \sum_{k=1}^{K} |y(k) - H_i^{(g)} s_i^{(g)}(k)|^2 \quad (3)$$

$N_R$ is a quantity of antennas at a receive end.

Step 3: Inner iteration.

Step 3.1: Search for the sample channel matrix having the smallest cost function (namely, an optimal sample channel matrix) and a sample channel matrix having a largest cost function (namely, a worst sample channel matrix) in the Ps sample channel matrices, which are denoted as:

$$H_{best}^{(g)} = \operatorname{argmin}_{H_i^{(g)}, 1 \le i \le P_S} J_i,$$

$$H_{worst}^{(g)} = \operatorname{argmax}_{H_i^{(g)}, 1 \le i \le P_S} J_i.$$

Step 3.2: Update a weighting factor. Specifically, for the $i^{th}$ sample, a factor $$\beta_t = \frac{\eta_t}{1 - \eta_t}$$

is calculated and updated, where $$\eta_t = \sum_{i=1}^{P_S} \delta_i(t-1)\overline{J}_i, \text{ and } \overline{J}_i = \frac{J_i}{\sum_{j=1}^{P_S} J_j}, 1 \le i \le P_S.$$

The weighting factor is then calculated, updated, and normalized according to the following formula:

$$\delta_i(t) = \begin{cases} \delta_i(t-1)\beta_t^{\overline{J}_i}, & \text{for } \beta_t \le 1 \\ \delta_i(t-1)\beta_t^{1-\overline{J}_i}, & \text{for } \beta_t > 1 \end{cases}$$

$$\delta_i(t) = \frac{\delta_i(t)}{\sum_{j=1}^{P_S} \delta_j(t)}, 1 \le i \le P_S$$

Step 3.3: Calculate the $P_S+1^{th}$ sample channel matrix $H_{P_S+1} = \sum_{i=1}^{P_S} \delta_i(t) H_i^{(g)}$ and the $P_{P_S+2}^{th}$ sample channel matrix $H_{P_S+2} = H_{best}^{(g)} + (H_{best}^{(g)} - H_{P_S+1})$, and obtain corresponding transmitted symbol vectors $s_{P_S+1}^{(g)}$ and $s_{P_S+2}^{(g)}$ through MIMO detection.

Step 3.4: Calculate corresponding cost function values $J_{P_S+1} = J(H_{P_S+1}^{(g)})$ and $J_{P_S+2} = J(H_{P_S+2}^{(g)})$ according to formula (3), to obtain a channel matrix having a smaller cost function value in the two cost function values (namely, $H_{P_S+1}$ or $H_{P_S+2}$), and replace the sample channel matrix having the largest cost function value in the $P_S$ sample channel matrices with the channel matrix having the smaller cost function value.

Step 3.5: If $H_{P_S+1}$ is close to $H_{P_S+2}$, that is, $|H_{P_S+1} - H_{P_S+2}| < \varepsilon$, end the current inner loop in advance, and go to step 4.

If $|H_{P_S+1} - H_{P_S+2}| \ge \varepsilon$, the inner loop index t=t+1. Whether a quantity of inner iterations reaches the maximum quantity of inner iterations, that is, whether $t=N_b$, is determined. If $t<N_b$, the process returns to step 3.1; otherwise, the process goes to step 4.

Step 4: End determining and output a result.

Whether a quantity of outer iterations reaches the maximum quantity of outer iterations is determined, that is, whether $g=N_g$, is determined. If $g<N_g$, the process returns to step 2; otherwise, a sample channel matrix $H_{best}^{(N_G)}$ currently having the smallest cost function value is output as a final channel estimation result.

It should be noted that, in the embodiment shown in FIG. 6A and FIG. 6B, the smallest cost function value indicates the optimal cost function value. Certainly, the largest cost function value may alternatively indicate the optimal cost function value. This is not limited in this application.

To resolve the foregoing problem (2), this application provides two different reference signal resource configuration methods.

Figure 7:
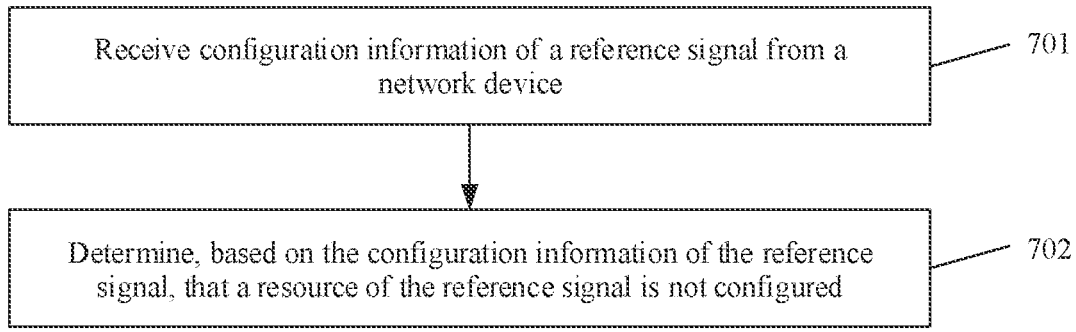
FIG. 7 is a flowchart of a reference signal resource configuration method according to this application.

In a first implementation, a new reference signal type is defined, for example, a DMRS type 3, to indicate that a resource of a reference signal is not configured. Based on this design, FIG. 7 is a flowchart of a reference signal resource configuration method according to this application. The method may be performed by a terminal device or a chip used in the terminal device.

The method includes the following steps.

Step 701: Receive configuration information of a reference signal from a network device.

The configuration information may be included in radio resource control (RRC) signaling.

The reference signal herein may be a DMRS, or may be another reference signal. This is not limited in this application. For ease of description, the following uses the DMRS as an example for description.

Step 702: Determine, based on the configuration information of the reference signal, that a resource of the reference signal is not configured.

To be specific, it is determined, based on the configuration information of the reference signal, that a reference signal type is the DMRS type 3, to further determine that the resource of the reference signal is not configured.

According to this solution, it may be determined, based on the received configuration information of the reference signal, that the resource of the reference signal is not configured. This solution may be used in combination with the foregoing channel estimation method in this application, to implement blind channel estimation without configuring a DMRS resource. Because no DMRS resource needs to be configured, the network device does not need to indicate a DMRS port to the terminal device, so that overheads of downlink control information can be reduced.

The following provides two specific implementations of the foregoing solution.

Method 1: When the configuration information of the reference signal includes first indication information, it is determined, based on the first indication information, that the resource of the reference signal is not configured.

For example, the first indication information is for indicating the DMRS type 3, so as to determine that the resource of the reference signal is not configured.

The following describes the method with reference to a specific example.

Based on the method 1, in this embodiment, the DMRS may be configured in the following manner:

| DMRS-DownlinkConfig information element |
| --- |
| -- ASN1START |
| -- TAG-DMRS-DOWNLINKCONFIG-START |
| DMRS-DownlinkConfig ::=    SEQUENCE { |
|     dmrs-Type              ENUMERATED {type2,type3} |
| OPTIONAL, -- Need S |
|     dmrs-AdditionalPosition    ENUMERATED {pos0, pos1, pos3} |
| OPTIONAL, -- Need S |
|     maxLength              ENUMERATED {len2} |
| OPTIONAL, -- Need S |
|     scramblingID0          INTEGER (0..65535) |
| OPTIONAL, -- Need S |
|     scramblingID1          INTEGER (0..65535) |
| OPTIONAL, -- Need S |
|     phaseTrackingRS        SetupRelease { PTRS-DownlinkConfig } OPTIONAL, -- Need M |
|     ... |
| } |

DMRS-DownlinkConfig includes the subfield dmrs-Type, and the subfield includes 1 bit. When the subfield does not exist, it indicates a DMRS type 1. When the subfield exists and a value of the subfield is 0, it indicates a DMRS type 2. When the subfield exists and a value of the subfield is 1, it indicates the DMRS type 3. Therefore, the value "1" of the subfield dmrs-Type is the first indication information.

When DMRS-DownlinkConfig includes the subfield dmrs-Type and the value of dmrs-Type is 1, it indicates that the DMRS type 3 is configured, and there is no DMRS resource in downlink transmission. Accordingly, when downlink data is scheduled by using downlink control information (DCI), a DMRS port does not need to be indicated.

It should be noted that the foregoing is merely used as an example. During actual application, another indication manner may be used. For example, when the subfield dmrs-Type exists, it indicates the DMRS type 2. When the subfield exists and the value of the subfield is 1, it indicates the DMRS type 1. When the subfield exists and the value of the subfield is 0, it indicates the DMRS type 3. Therefore, the value "0" of the subfield dmrs-Type is the first indication information.

Method 2: When it is determined that the configuration information of the reference signal does not include second indication information, it is determined that the resource of the reference signal is not configured, where the second indication information is for indicating a preset-type reference signal, and the preset-type reference signal indicates that a reference signal is configured for a terminal device.

When the reference signal is a DMRS, the reference signal, indicated by the second indication information, of the preset type is a configuration type 1 (namely, a DMRS type 1) or a configuration type 2 (namely, a DMRS type 2).

The following describes the method with reference to a specific example.

Based on the method 2, in this application, configuration or notification may be alternatively performed using higher layer signaling, dynamic signaling (for example, DCI), or the like. For example, the higher layer signaling is DMRS-DownlinkConfig. In this application, the DMRS may be configured in the following manner.

| DMRS-DownlinkConfig information element |
| --- |
| -- ASN1START |
| -- TAG-DMRS-DOWNLINKCONFIG-START |
| DMRS-DownlinkConfig ::=    SEQUENCE { |
|     dmrs-Type              ENUMERATED {type1,type2} |
| OPTIONAL, -- Need S |
|     dmrs-AdditionalPosition    ENUMERATED {pos0, pos1, pos3} |
| OPTIONAL, -- Need S |
|     maxLength              ENUMERATED {len2} |
| OPTIONAL, -- Need S |
|     scramblingID0          INTEGER (0..65535) |
| OPTIONAL, -- Need S |
|     scramblingID1          INTEGER (0..65535) |
| OPTIONAL, -- Need S |
|     phaseTrackingRS        SetupRelease { PTRS-DownlinkConfig } OPTIONAL, -- Need M |
|     ... |
| } |

The higher layer signaling DMRS-DownlinkConfig includes the subfield dmrs-Type, and the subfield includes 1 bit. When the subfield does not exist, it indicates the DMRS type 3. When the subfield exists and the value of the subfield is 0, it indicates a DMRS type 1. When the subfield exists and the value of the subfield is 1, it indicates a DMRS type 2. Therefore, the value "0" or "1" of the subfield dmrs-Type is the second indication information.

When DMRS-DownlinkConfig does not include the subfield dmrs-Type, it indicates that the DMRS type 3 is configured, and there is no DMRS resource in downlink transmission. Accordingly, when downlink data is scheduled by using DCI, a DMRS port does not need to be indicated.

For another example, the reference signal may alternatively be a channel state information-reference signal (CSI-RS). The following describes the method with reference to a specific example. A network device configures a CSI-RS resource using higher layer signaling CSI-RS-ResourceMapping.

| CSI-RS-ResourceMapping information element |
| --- |
| -- ASN1START |
| -- TAG-CSI-RS-RESOURCEMAPPING-START |
| CSI-RS-ResourceMapping ::= SEQUENCE { |
|     frequencyDomainAllocation    CHOICE { |
|         row1      BIT STRING (SIZE (4)), |
|         row2      BIT STRING (SIZE (12)), |
|         row4      BIT STRING (SIZE (3)), |
|         other     BIT STRING (SIZE (6)) |
|     }, |
|     nrofPorts ENUMERATED {p1,p2,p4,p8,p12,p16,p24,p32}, |
|     firstOFDMSymbolInTimeDomain    INTEGER (0..13), |
|     firstOFDMSymbolInTimeDomain2   INTEGER (2..12) |
| OPTIONAL, -- Need R |
|     cdm-Type ENUMERATED {noCDM, fd-CDM2, cdm4-FD2-TD2, cdm8-FD2-TD4}, |
|     density    CHOICE { |
|         dot5      ENUMERATED {evenPRBs, oddPRBs}, |
|         one       NULL, |
|         three     NULL, |
|         spare     NULL |
|     }, |
|     freqBand    CSI-FrequencyOccupation, |
|     ... |
| } |
| -- TAG-CSI-RS-RESOURCEMAPPING-STOP |
| -- ASN1STOP |

Method 1: A state p0 is added to nrofPorts, to indicate that a quantity of ports is 0, and that there is no CSI-RS resource mapping.

When the subfield nrofPorts indicates p0, it indicates that there is no CSI-RS resource mapping, that is, it indicates that the CSI-RS resource is not configured.

When the subfield nrofPorts indicates one of p1, p2, p4, p8, p12, p16, p24, or p32, it indicates that there is the CSI-RS resource mapping, that is, it indicates that the CSI-RS resource is configured.

Method 2: Whether there is the CSI-RS resource mapping is determined based on presence of the subfield nrofPorts.

When CSI-RS-ResourceMapping includes the subfield nrofPorts, it indicates that there is the CSI-RS resource mapping, that is, it indicates that the CSI-RS resource is not configured.

When CSI-RS-ResourceMapping does not include the subfield nrofPorts, it indicates that there is no CSI-RS resource mapping, that is, it indicates that the CSI-RS resource is configured.

Method 3: A new state, for example, a state 0, is added to firstOFDMSymbolInTimeDomain2, to indicate that there is no CSI-RS resource mapping.

When the subfield firstOFDMSymbolInTimeDomain2 indicates 0, it indicates that there is no CSI-RS resource mapping, that is, it indicates that the CSI-RS resource is not configured.

When the subfield firstOFDMSymbolInTimeDomain2 indicates one of 2, 3, 4, 5, 6, 7, 8, 9, 10, 11, or 12, it indicates that there is the CSI-RS resource mapping, that is, it indicates that the CSI-RS resource is configured.

Method 4: Whether there is the CSI-RS resource mapping is determined based on presence of the subfield firstOFDMSymbolInTimeDomain2.

When CSI-RS-ResourceMapping includes the subfield firstOFDMSymbolInTimeDomain2, it indicates that there is the CSI-RS resource mapping, that is, it indicates that the CSI-RS resource is configured.

When CSI-RS-ResourceMapping does not include the subfield firstOFDMSymbolInTimeDomain2, it indicates that there is no CSI-RS resource mapping, that is, it indicates that the CSI-RS resource is not configured.

For another example, the reference signal may alternatively be a sounding reference signal (SRS). The following describes the method with reference to a specific example. A network device configures an SRS resource using higher layer signaling SRS-Resource.

```
SRS-Resource ::=                SEQUENCE {
    srs-ResourceId                  SRS-ResourceId,
    nrofSRS-Ports                   ENUMERATED {port1, ports2, ports4},
    ptrs-PortIndex                  ENUMERATED {n0, n1 }      OPTIONAL,
-- Need R
    transmissionComb                CHOICE {
        n2 SEQUENCE {
            combOffset-n2               INTEGER (0..1),
            cyclicShift-n2              INTEGER (0..7)
        },
        n4 SEQUENCE {
            combOffset-n4               INTEGER (0..3),
            cyclicShift-n4              INTEGER (0..11)
        }
    },
    resourceMapping                 SEQUENCE {
        startPosition                   INTEGER (0..5),
        nrofSymbols                     ENUMERATED {n1, n2, n4}
        repetitionFactor                ENUMERATED {n1, n2, n4}
    },
    freqDomainPosition              INTEGER (0..67),
    freqDomainShift                 INTEGER (0..268),
    freqHopping                     SEQUENCE {
        c-SRS                           INTEGER (0..63),
        b-SRS                           INTEGER (0..3),
        b-hop                           INTEGER (0..3)
    },
    groupOrSequenceHopping          ENUMERATED { neither, groupHopping,
sequenceHopping },
    resourceType                    CHOICE {
        aperiodic                       SEQUENCE {
            ...
        },
        semi-persistent                 SEQUENCE {
            periodicityAndOffset-sp         SRS-PeriodicityAndOffset,
            ...
        },
        periodic        SEQUENCE {
            periodicityAndOffset-p          SRS-PeriodicityAndOffset,
            ...
        }
    },
    sequenceId      INTEGER (0..1023),
    spatialRelationInfo     SRS-SpatialRelationInfo     OPTIONAL,
-- Need R
    ...
}
```

Method 1: A state port0 is added to nrofSRS-Ports, to indicate that there is no SRS resource mapping, that is, to indicate that a CSI-RS resource is not configured.

When the subfield nrofSRS-Ports indicates port0, it indicates that there is no SRS resource mapping, that is, it indicates that the CSI-RS resource is not configured.

When the subfield nrofSRS-Ports indicates one of port1, port2, or port4, it indicates that there is the SRS resource mapping, that is, it indicates that the CSI-RS resource is configured.

Method 2: Whether there is the SRS resource mapping is determined based on presence of the subfield nrofSRS-Ports.

When SRS-Resource includes the subfield nrofSRS-Ports, it indicates that there is the SRS resource mapping, that is, it indicates that the CSI-RS resource is configured.

When SRS-Resource does not include the subfield nrofSRS-Ports, it indicates that there is no SRS resource mapping, that is, it indicates that the CSI-RS resource is not configured.

Method 3: A new state, for example, a state 0, is added to nrofSymbols, to indicate that there is no SRS resource mapping.

When the subfield nrofSymbols indicates 0, it indicates that there is no SRS resource mapping, that is, it indicates that the CSI-RS resource is not configured.

When the subfield nrofSymbols indicates one of n1, n2, or n4, it indicates that there is the SRS resource mapping, that is, it indicates that the CSI-RS resource is configured.

Method 4: Whether there is the SRS resource mapping is determined based on presence of the subfield nrofSymbols.

When SRS-Resource includes the subfield nrofSymbols, it indicates that there is the SRS resource mapping, that is, it indicates that the CSI-RS resource is configured.

When SRS-Resource does not include the subfield nrofSymbols, it indicates that there is no SRS resource mapping, that is, it indicates that the CSI-RS resource is not configured.

Figure 8:
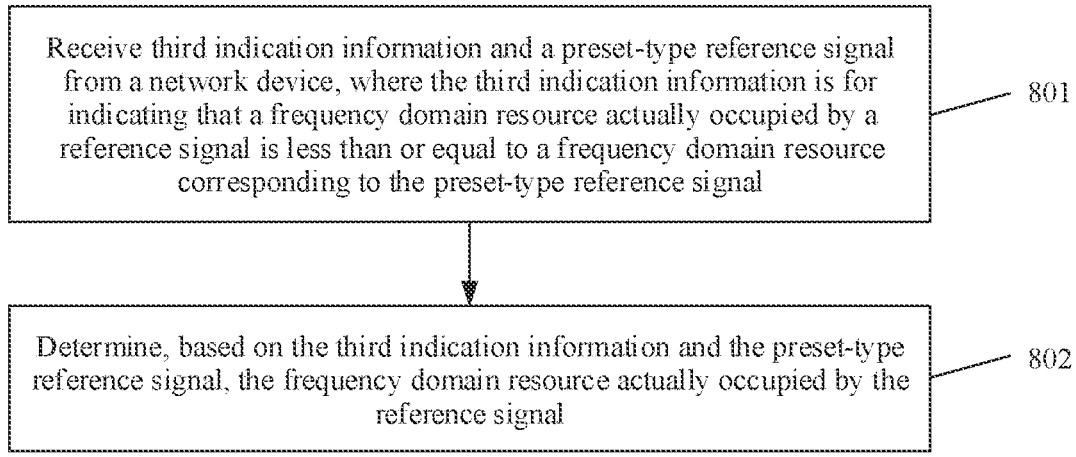
FIG. 8 is a flowchart of another reference signal resource configuration method according to this application.

FIG. 8 is a flowchart of another reference signal resource configuration method according to this application. The method may be performed by a terminal device or a chip used in the terminal device.

Step 801: Receive third indication information and a preset-type reference signal from a network device, where the third indication information is for indicating that a frequency domain resource actually occupied by a reference signal is less than or equal to a frequency domain resource corresponding to the preset-type reference signal.

The reference signal herein may be a DMRS, or may be another reference signal. This is not limited in this application.

For example, the reference signal is a DMRS, and the preset type herein includes a configuration type 1 and a configuration type 2.

Step 802: Determine, based on the third indication information and the preset-type reference signal, the frequency domain resource actually occupied by the reference signal.

According to this solution, a new DMRS type does not need to be defined based on an existing DMRS configuration. The indication information may be for indicating that the frequency domain resource occupied by the configured reference signal is a subset of DMRS frequency domain resources in the existing configuration. This improves flexibility of configuring the reference signal while compatibility of the existing DMRS configuration is considered.

In an implementation, the third indication information may be specifically used to indicate a first ratio of the frequency domain resource actually occupied by the reference signal to the frequency domain resource occupied by the preset-type reference signal.

For example, in a case, w % ben the first ratio is equal to 0, it indicates that the frequency domain resource of the reference signal is not configured. In other words, it may be determined, based on the first ratio and the preset-type reference signal, that the frequency domain resource of the reference signal is not configured.

For another example, in another case, when the first ratio is a positive number less than or equal to 1, it indicates that a ratio of the frequency domain resource actually occupied by the configured reference signal to the frequency domain resource occupied by the preset-type reference signal is the first ratio.

When the first ratio is a positive number less than or equal to 1, fourth indication information may further be received from the network device, where the fourth indication information is for indicating an offset of a time domain resource actually occupied by the reference signal relative to a time domain resource occupied by the preset-type reference signal; and the time domain resource actually occupied by the reference signal is determined based on the fourth indication information and the preset type of the reference signal. In other words, both the frequency domain resource and the time domain resource occupied by the configured reference signal may be determined.

The following describes the solution of the embodiment in FIG. 8 with reference to specific examples and the accompanying drawings. It should be noted that an example in which the reference signal is a DMRS is used for description in this example. However, this is not limited to that the reference signal is a DMRS, for example, the reference signal may alternatively be a CSI-RS or an SRS.

Figure 9:
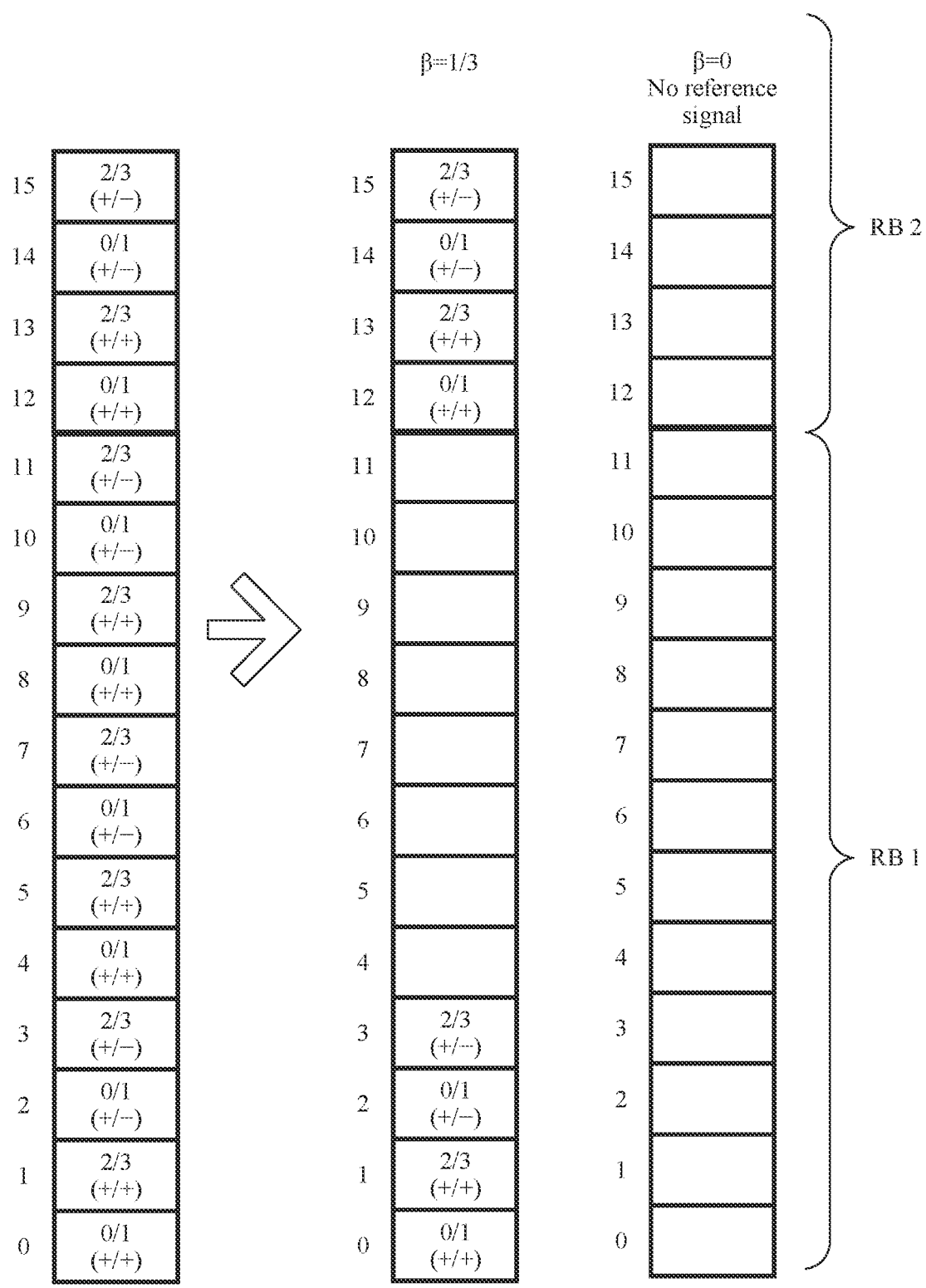
FIG. 9 is a schematic diagram of a low-overhead reference signal indication method based on an existing NR DMRS configuration according to this application.

FIG. 9 is a schematic diagram of a low-overhead reference signal indication method based on an existing NR DMRS configuration according to this application. A single symbol of a DMRS type 1 is used as an example, and a time-frequency resource mapping manner is shown in the left diagram in FIG. 9. A DMRS port 0 or 1 occupies subcarriers with even indexes, and a DMRS port 2 or 3 occupies subcarriers with odd indexes. In one OFDM symbol, all subcarriers are occupied by a DMRS.

A DMRS design applicable to the foregoing channel estimation method provided in this application does not require such a dense DMRS arrangement, and even does not require DMRS. Therefore, the network device may send indication information to the terminal device, where the indication information is for indicating that a part of existing DMRS resources are used. Specifically, the indication information includes a frequency domain length indication (namely, the third indication information), the frequency domain length indication is for indicating a proportion coefficient $\beta$, and $\beta$ is a real number less than or equal to 1. An optional value of $\beta$ may be one or more preset values. For example, $\beta=1$, $\beta=\frac{1}{3}$, or $\beta=0$. $\beta$ is for indicating that a length of a frequency domain resource of the DMRS is $\beta$ times a length of a frequency domain resource corresponding to an existing DMRS type. As shown in FIG. 9, when $\beta=\frac{1}{3}$, only $\frac{1}{3}$ subcarriers in a resource block (RB) are used for the DMRS resource. In particular. $\beta=0$ indicates that there is no DMRS resource. $\beta=1$ indicates an existing NR DMRS resource mapping manner.

In addition, the indication information may alternatively include a time domain position indication (namely, the fourth indication information), used to indicate an offset of a time domain resource of the DMRS relative to a time domain resource of the existing DMRS. For example, when the time domain position indication is for indicating a quantity $l_A$ of offset symbols, it indicates that an OFDM symbol in which the DMRS is located: $l=\overline{l}+l_A$. $\overline{l}$ represents an OFDM symbol in which a DMRS defined in an existing protocol is located.

It may be understood that in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed. In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing method embodiment, the method implemented by the terminal device may also be implemented by a component (for example, a chip or a circuit) that can be used in the terminal device. This is not limited in embodiments of this application.

Figure 10:
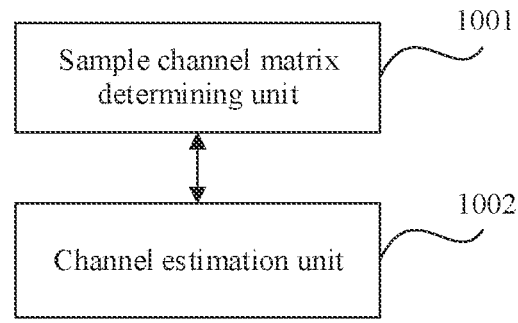
FIG. 10 is a schematic diagram of a communication apparatus according to this application.

FIG. 10 is a possible example block diagram of a communication apparatus according to an embodiment of the present invention. The apparatus 1000 may exist in a form of software or hardware. The apparatus 1000 may include a sample channel matrix determining unit 1001 and a channel estimation unit 1002. In an implementation, the sample channel matrix determining unit 1001 and the channel estimation unit 1002 may be integrated into one processing unit. The processing unit is configured to control and manage an action of the apparatus 1000.

When the sample channel matrix determining unit 1001 and the channel estimation unit 1002 are integrated into one processing unit, the processing unit may be a processor or a controller, for example, may be a general-purpose central processing unit (CPU), a general-purpose processor, digital signal processor (DSP), an application-specific integrated circuit (ASIC), a field programmable gate array (FPGA), or another programmable logic device, a transistor logic device, a hardware component, or any combination thereof. The processing unit may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

The apparatus 1000 may be a terminal device or a network device configured to perform the embodiment in FIG. 4, or may be a chip configured to perform the embodiment in FIG. 4. For example, when the sample channel matrix determining unit 1001 and the channel estimation unit 1002 are integrated into one processing unit, the processing unit may be, for example, a processor.

In an embodiment, the sample channel matrix determining unit 1001 is configured to determine Ps initial sample channel matrices that indicate channel states, where the Ps initial sample channel matrices include P1 first sample channel matrices and Ps-P1 second sample channel matrices, the P1 first sample channel matrices are determined based on a previous sample channel matrix or a given reference signal, Ps is an integer greater than 1, and P1 is a positive integer less than or equal to Ps. The channel estimation unit 1002 is configured to determine a channel matrix based on the Ps initial sample channel matrices, and obtain a channel estimation result.

In a possible implementation, at least one of the Ps-P1 second sample channel matrices is a sum of any one of the P1 first sample channel matrices and a first perturbation matrix, and each element in the first perturbation matrix is a complex-valued Gaussian random variable whose average value is 0 and variance is $\sigma^2$; at least one of the Ps-P1 second sample channel matrices is generated based on a preset random algorithm; or at least one of the Ps-P1 second sample channel matrices is obtained by performing channel estimation based on at least one group of signal detection results in a plurality of groups of signal detection results, where the plurality of groups of signal detection results are obtained by grouping data signal detection results, and the data signal detection results are obtained by detecting a data signal by using any one of the P1 first sample channel matrices.

For specific advantageous effects of performing the channel estimation method by the apparatus shown in FIG. 10, refer to the related descriptions in the foregoing method embodiment shown in FIG. 4. Details are not described herein again. It may be understood that the unit in this embodiment of this application may also be referred to as a module. The foregoing units or modules may exist independently, or may be integrated together.

Figure 11:
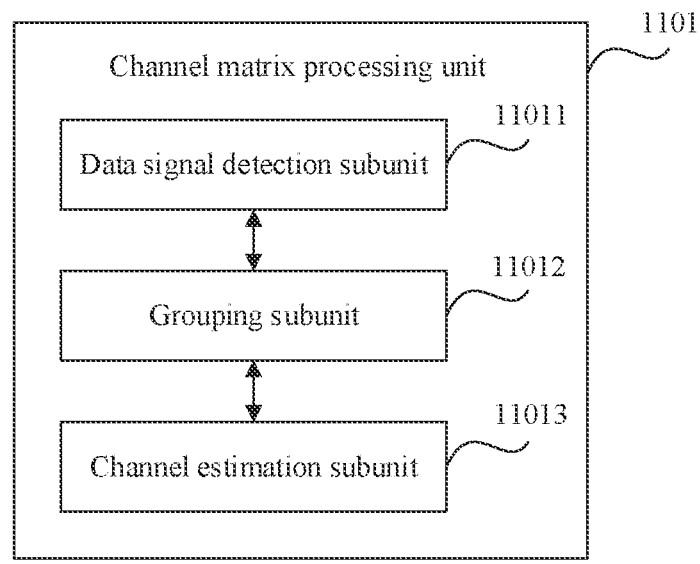
FIG. 11 is a schematic diagram of another communication apparatus according to this application.

FIG. 11 is a possible example block diagram of a communication apparatus according to an embodiment of the present invention. The apparatus 1100 may exist in a form of software or hardware. The apparatus 1100 may include a channel matrix processing unit 1101. The channel matrix processing unit 1101 includes a data signal detection subunit 11011, a grouping subunit 11012, and a channel estimation subunit 11013. In an implementation, the channel matrix processing unit 1101 may be integrated into a processing unit. The processing unit is configured to control and manage an action of the apparatus 1100.

When the channel matrix processing unit 1101 is integrated into one processing unit, the processing unit may be a processor or a controller, for example, may be a CPU, a general-purpose processor, a DSP, an ASIC, an FPGA, or another programmable logic device, a transistor logic device, a hardware component, or any combination thereof. The processing unit may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

The apparatus 1100 may be a terminal device or a network device configured to perform the embodiment in FIG. 5, or may be a chip configured to perform the embodiment in FIG. 5. For example, when the channel matrix processing unit 1101 is integrated into a processing unit, the processing unit may be, for example, a processor.

In an embodiment, the channel matrix processing unit 1101 is configured to obtain a channel matrix by processing a data signal and a sample channel matrix for N times, where N is a positive integer. In single-time processing, the following steps are included:

The data signal detection subunit 11011 is configured to detect the data signal by using third sample channel matrices, to obtain data signal detection results; the grouping subunit 11012 is configured to group the data signal detection results, to obtain a plurality of groups of signal detection results; and the channel estimation subunit 11013 is configured to perform channel estimation based on at least one group of signal detection results in the plurality of groups of signal detection results, to obtain at least one estimated channel matrix.

In a possible implementation, a third sample channel matrix used in the first time of processing in the N times of processing is a channel matrix having an optimal cost function value in Ps initial sample channel matrices on which processing is performed.

In a possible implementation, the Ps initial sample channel matrices include P1 first sample channel matrices and Ps-P1 second sample channel matrices, the P1 first sample channel matrices are determined based on a previous sample channel matrix or a given reference signal, Ps is an integer greater than 1, and P1 is a positive integer less than or equal to Ps.

In a possible implementation, at least one of the Ps-P1 second sample channel matrices is a sum of any one of the P1 first sample channel matrices and a first perturbation matrix, and each element in the first perturbation matrix is a complex-valued Gaussian random variable whose average value is 0 and variance is $\sigma^2$.

In a possible implementation, the Ps initial sample channel matrices are randomly generated sample channel matrices.

In a possible implementation, a third sample channel matrix used in processing other than the first time of processing in the N times of processing is a channel matrix having an optimal cost function value.

In a possible implementation, the channel matrix having the optimal cost function value is obtained by processing a plurality of fourth sample channel matrices, and the plurality of fourth sample channel matrices include at least one of the estimated channel matrices.

In a possible implementation, the plurality of fourth sample channel matrices further include a randomly generated sample channel matrix.

In a possible implementation, at least one of the plurality of fourth sample channel matrices is a sum of the third sample channel matrix and a second perturbation matrix, and each element in the second perturbation matrix is a complex-valued Gaussian random variable whose average value is 0 and variance is $\sigma^2$.

For specific advantageous effects of performing the channel estimation method by the apparatus shown in FIG. 11, refer to the related descriptions in the foregoing method embodiment shown in FIG. 5. Details are not described herein again. It may be understood that the unit in this embodiment of this application may also be referred to as a module. The foregoing units or modules may exist independently, or may be integrated together.

Figure 12:
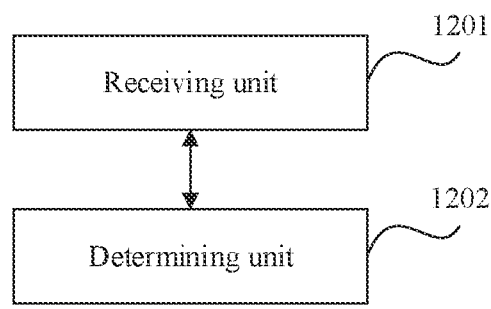
FIG. 12 is a schematic diagram of another communication apparatus according to this application.

FIG. 12 is a possible example block diagram of a communication apparatus according to an embodiment of the present invention. The apparatus 1200 may exist in a form of software or hardware. The apparatus 1200 may include a receiving unit 1201 and a determining unit 1202. In an implementation, the determining unit 1202 may be integrated into a processing unit. The processing unit is configured to control and manage an action of the apparatus 1200.

When the determining unit 1202 is integrated into one processing unit, the processing unit may be a processor or a controller, for example, may be a CPU, a general-purpose processor, a DSP, an ASIC, an FPGA, or another programmable logic device, a transistor logic device, a hardware component, or any combination thereof. The processing unit may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

The apparatus 1200 may be a terminal device configured to perform the embodiment in FIG. 7, or may be a chip configured to perform the embodiment in FIG. 7. For example, when the determining unit 1202 is integrated into a processing unit, the processing unit may be, for example, a processor.

In an embodiment, the receiving unit 1201 is configured to receive configuration information of a reference signal from a network device: and the determining unit 1202 is configured to determine, based on the configuration information of the reference signal, that a resource of the reference signal is not configured.

In a possible implementation, the configuration information of the reference signal includes first indication information; and the determining unit 1202 is specifically configured to determine, based on the first indication information, that the resource of the reference signal is not configured.

In a possible implementation, the determining unit 1202 is specifically configured to: when determining that the configuration information of the reference signal does not include second indication information, determine that the resource of the reference signal is not configured, where the second indication information is for indicating a preset-type reference signal, and the preset-type reference signal indicates that a reference signal is configured for a terminal device.

In a possible implementation, the reference signal is a DMRS, and the preset-type reference signal indicated by the second indication information is a configuration type 1 or a configuration type 2.

For specific advantageous effects of performing the channel estimation method by the apparatus shown in FIG. 12, refer to the related descriptions in the foregoing method embodiment shown in FIG. 7. Details are not described herein again. It may be understood that the unit in this embodiment of this application may also be referred to as a module. The foregoing units or modules may exist independently, or may be integrated together.

Figure 13:
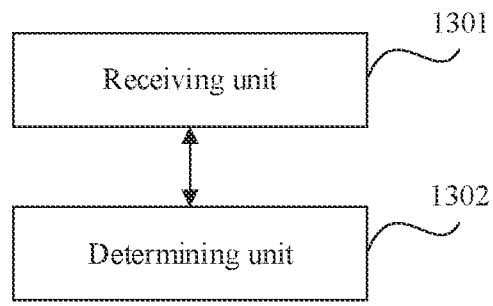
FIG. 13 is a schematic diagram of another communication apparatus according to this application.

FIG. 13 is a possible example block diagram of a communication apparatus according to an embodiment of the present invention. The apparatus 1300 may exist in a form of software or hardware. The apparatus 1300 may include a receiving unit 1301 and a determining unit 1302. In an implementation, the determining unit 1302 may be integrated into a processing unit. The processing unit is configured to control and manage an action of the apparatus 1300.

When the determining unit 1302 is integrated into one processing unit, the processing unit may be a processor or a controller, for example, may be a CPU, a general-purpose processor, a DSP, an ASIC, an FPGA, or another programmable logic device, a transistor logic device, a hardware component, or any combination thereof. The processing unit may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

The apparatus 1300 may be a terminal device configured to perform the embodiment in FIG. 8, or may be a chip configured to perform the embodiment in FIG. 8. For example, when the determining unit 1302 is integrated into a processing unit, the processing unit may be, for example, a processor.

In an embodiment, the receiving unit 1301 is configured to receive third indication information and a preset-type reference signal from a network device, where the third indication information is for indicating that a frequency domain resource actually occupied by a reference signal is less than or equal to a frequency domain resource corresponding to the preset-type reference signal, and the determining unit 1302 is configured to determine, based on the third indication information and the preset-type reference signal, the frequency domain resource actually occupied by the reference signal.

In a possible implementation, the third indication information indicates a first ratio of the frequency domain resource actually occupied by the reference signal to the frequency domain resource occupied by the preset-type reference signal.

In a possible implementation, the first ratio is 0. The determining unit 1302 is specifically configured to determine, based on the first ratio and the preset-type reference signal, that the frequency domain resource of the reference signal is not configured.

In a possible implementation, the first ratio is a positive number less than or equal to 1; and the receiving unit 1301 is further configured to receive fourth indication information from the network device, where the fourth indication information is for indicating an offset of a time domain resource actually occupied by the reference signal relative to a time domain resource occupied by the preset-type reference signal; and determine, based on the fourth indication information and the preset type of the reference signal, the time domain resource actually occupied by the reference signal.

In a possible implementation, the reference signal is a DMRS, the preset type of the reference signal is a configuration type 1 or a configuration type 2.

For specific advantageous effects of performing the channel estimation method by the apparatus shown in FIG. 13, refer to the related descriptions in the foregoing method embodiment shown in FIG. 8. Details are not described herein again. It may be understood that the unit in this embodiment of this application may also be referred to as a module. The foregoing units or modules may exist independently, or may be integrated together.

Figure 14:
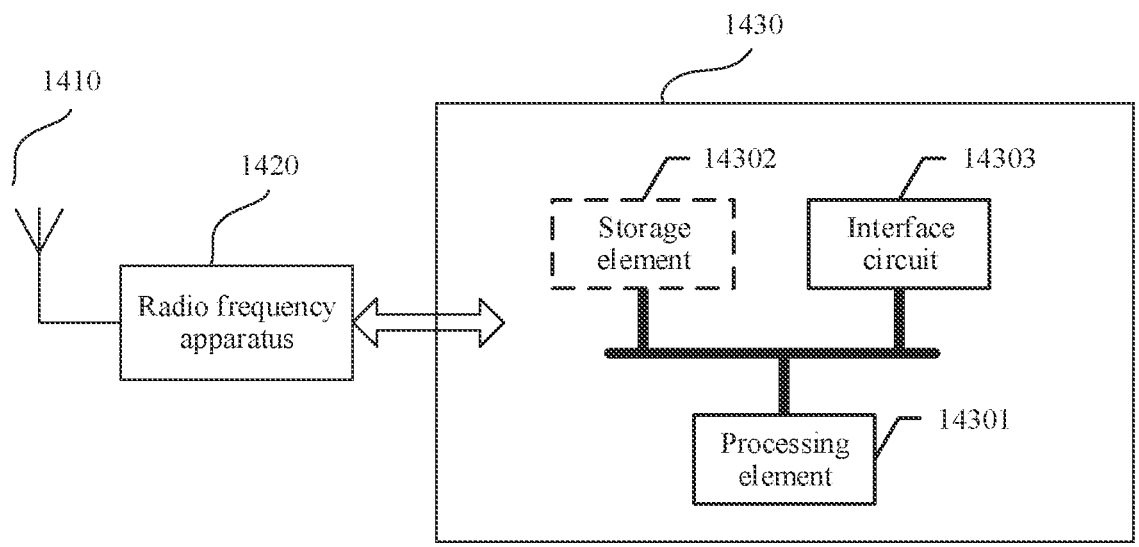
FIG. 14 is a schematic diagram of a terminal device according to this application.

FIG. 14 is a schematic diagram of a structure of a terminal device according to an embodiment of this application. The terminal device is configured to implement operations of the terminal device in the foregoing embodiments. As shown in FIG. 14, the terminal device includes an antenna 1410, a radio frequency apparatus 1420, and a signal processing part 1430. The antenna 1410 is connected to the radio frequency apparatus 1420. In a downlink direction, the radio frequency apparatus 1420 receives, through the antenna 1410, information sent by a network device, and sends, to the signal processing part 1430 to process, the information sent by the network device. In an uplink direction, the signal processing part 1430 processes information from the terminal device, and sends the information to the radio frequency apparatus 1420. The radio frequency apparatus 1420 processes the information from the terminal device, and then sends the processed information to the network device through the antenna 1410.

The signal processing part 1430 is configured to process each communication protocol layer of data. The signal processing part 1430 may be a subsystem of the terminal device. The terminal device may further include another subsystem, for example, a central processing subsystem, configured to process an operating system and an application layer of the terminal device; and for another example, a peripheral subsystem, configured to connect to another device. The signal processing part 1430 may be a separately disposed chip. Optionally, the foregoing apparatus may be located in the signal processing part 1430.

The signal processing part 1430 may include one or more processing elements 14301 (for example, include a main control CPU and another integrated circuit) and an interface circuit 14303. In addition, the signal processing part 1430 may further include a storage element 14302. The storage element 14302 is configured to store data and a program. The program used to perform the method performed by the terminal device in the foregoing method may be stored or may not be stored in the storage element 14302, for example, stored in a memory outside the signal processing part 1430. When used, the signal processing part 1430 loads the program into a cache for use. The interface circuit 14303 is configured to communicate with the apparatus. The foregoing apparatus may be located in the signal processing part 1430. The signal processing part 1430 may be implemented by a chip. The chip includes at least one processing element and an interface circuit. The processing element is configured to perform steps in any method performed by the foregoing terminal device. The interface circuit is configured to communicate with another apparatus. For example, the processing element 14301 may be configured to perform step 401 and step 402 in the embodiment of FIG. 4, step 501 to step 503 in the embodiment of FIG. 4, step 702 in the embodiment of FIG. 7, and step 802 in the embodiment of FIG. 8. For another example, the interface circuit 14303 may be configured to perform step 701 in the embodiment of FIG. 7, and perform step 801 in the embodiment of FIG. 8.

In an implementation, a unit configured to perform each step in the foregoing method may be implemented in a form of a program invoked by a processing element. For example, the apparatus includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the method performed by the terminal device in the foregoing method may be in a storage element that is on a different chip from the processing unit, that is, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the signal processing part 1430. The processing element herein may be an integrated circuit, for example, one or more ASICs, one or more DSPs, one or more FPGAs, or a combination of these types of integrated circuits. These integrated circuits may be integrated together to form a chip.

The units configured to implement the steps in the foregoing method may be integrated together and implemented in a form of a system-on-a-chip (SOC). The SOC chip is configured to implement the foregoing method. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus may include at least one processing element and interface circuit. The at least one processing element is configured to perform any one of the methods that are provided in the foregoing method embodiments and performed by the terminal device. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processor element in combination with instructions: or may certainly perform, by combining the first manner and the second manner, some or all steps performed by the terminal device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be one memory, or may be a general term of a plurality of storage elements.

Figure 15:
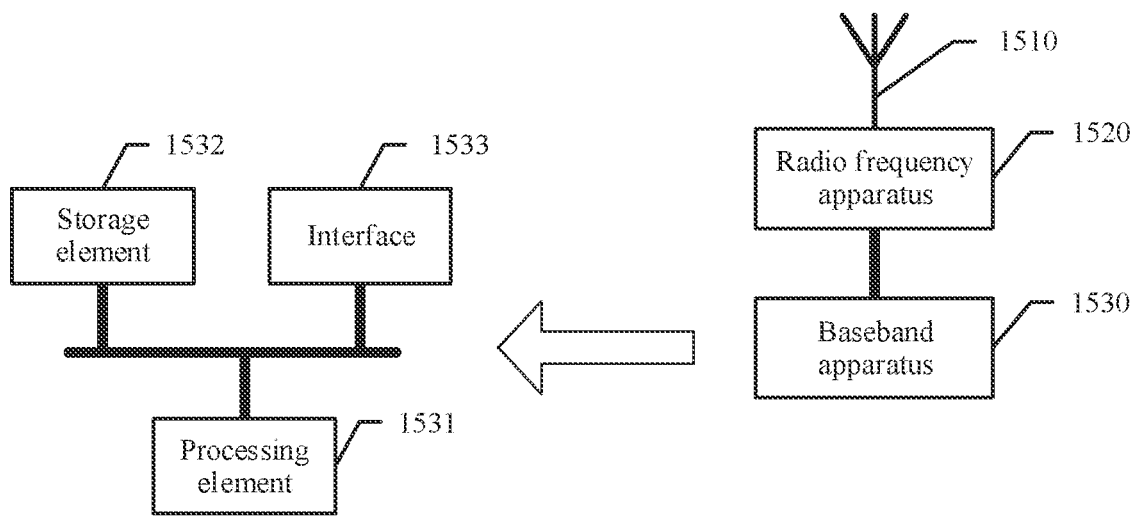
FIG. 15 is a schematic diagram of a network device according to this application.

FIG. 15 is a schematic diagram of a structure of a network device according to an embodiment of this application. The network device is configured to implement operations of the network device in the foregoing embodiments. As shown in FIG. 15, the network device includes an antenna 1510, a radio frequency apparatus 1520, and a baseband apparatus 1530. The antenna 1510 is connected to the radio frequency apparatus 1520. In an uplink direction, the radio frequency apparatus 1520 receives, through the antenna 1510, information sent by a terminal device, and sends, to the baseband apparatus 1530 to process, the information sent by the terminal device. In a downlink direction, the baseband apparatus 1530 processes information from the terminal device and sends processed information to the radio frequency apparatus 1520, and the radio frequency apparatus 1520 processes the information from the terminal device and then sends processed information to the terminal device by using the antenna 1510.

The baseband apparatus 1530 may include one or more processing elements 1531, for example, include a main control CPU and another integrated circuit. In addition, the baseband apparatus 1530 may further include a storage element 1532 and an interface 1533. The storage element 1532 is configured to store a program and data. The interface 1533 is configured to exchange information with the radio frequency apparatus 1520, and the interface 1533 is, for example, a common public radio interface (CPRI). The foregoing apparatus used in the network device may be located in the baseband apparatus 1530. For example, the foregoing apparatus used in the network device may be a chip in the baseband apparatus 1530. The chip includes at least one processing element and an interface circuit. The processing element is configured to perform steps in any method performed by the network device. The interface circuit is configured to communicate with another apparatus. In an implementation, the units in the network device for implementing the steps in the foregoing method may be implemented in a form of scheduling a program by the processing element. For example, the apparatus used in the network device includes a processing element and a storage element. The processing element invokes a program stored in the storage element, to perform the method performed by the network device in the foregoing method embodiment. The storage element may be a storage element on the same chip as the processing element, that is, an on-chip storage element; or may be a storage element that is on a different chip from the processing element, that is, an off-chip storage element.

In another implementation, the units in the network device for implementing steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing method may be integrated together, and implemented in a form of a system-on-a-chip (SoC). For example, the baseband apparatus includes the SoC chip, configured to implement the foregoing method. At least one processing element and storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device in a first manner, that is, by invoking the program stored in the storage element; or may perform some or all steps performed by the network device, in a second manner, that is, by using a hardware integrated logic circuit in the processor element in combination with instructions: or may certainly perform, by combining the first manner and the second manner, some or all steps performed by the network device.

As described above, the processing element herein may be a general-purpose processor, for example, a CPU, or may be one or more integrated circuits, for example, one or more application-specific integrated circuits (ASICs), one or more microprocessors DSPS, or one or more FPGAs, or a combination of at least two of these types of integrated circuits, configured to implement the foregoing methods. The storage element may be one memory, or may be a general term of a plurality of storage elements.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an ASIC, a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in an ASIC, and the ASIC may be arranged in terminal. Alternatively, the processor and the storage medium may also be arranged in different components of the terminal.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Although this application is described with reference to specific features and embodiments thereof. It is clear that, various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A channel estimation method, comprising:
    determining one or more initial sample channel matrices based on a previous sample channel matrix or a reference signal;
    performing one or more rounds of iteration processing based on a channel estimation algorithm, wherein an input of the channel estimation algorithm comprises the one or more initial sample channel matrices and an output of the channel estimation algorithm is an estimated channel matrix; and
    determining that the estimated channel matrix as a channel estimation result in response to determining that a current iteration processing of the one or more rounds of iteration processing is a last iteration processing.

2. The method according to claim 1, wherein the one or more initial sample channel matrices are first sample channel matrices, the input of the channel estimation algorithm further comprises second sample channel matrices, wherein at least one of the second sample channel matrices is generated based on:
    a sum of a sample channel matrix of the first sample channel matrices and a first perturbation matrix, and each element in the first perturbation matrix is a complex-valued Gaussian random variable with an average value of 0 and a variance of $\sigma^2$;
    a preset random algorithm; or
    performing channel estimation based on at least one group of signal detection results in a plurality of groups of signal detection results, wherein the plurality of groups of signal detection results are obtained by grouping data signal detection results, and wherein the data signal detection results are obtained by detecting a data signal based on a sample channel matrix of the first sample channel matrices.

3. A channel estimation apparatus, comprising:
    at least one processor; and
    one or more memories coupled to the at least one processor and storing programming instructions for execution by the at least one processor to perform operations comprising:
        determining one or more initial sample channel matrices based on a previous sample channel matrix or a reference signal;

performing one or more rounds of iteration processing based on a channel estimation algorithm, wherein an input of the channel estimation algorithm comprises the one or more initial sample channel matrices and an output of the channel estimation algorithm is an estimated channel matrix; and determining that the estimated channel matrix as a channel estimation result in response to determining that a current iteration processing of the one or more rounds of iteration processing is a last iteration processing.

4. The channel estimation apparatus according to claim 3, wherein the one or more initial sample channel matrices are first sample channel matrices, the input of the channel estimation algorithm further comprises second sample channel matrices, wherein at least one of the second sample channel matrices is generated based on:

a sum of a sample channel matrix of the first sample channel matrices and a first perturbation matrix, and each element in the first perturbation matrix is a complex-valued Gaussian random variable with an average value of 0 and a variance of $\sigma^2$;

a preset random algorithm; or performing channel estimation based on at least one group of signal detection results in a plurality of groups of signal detection results, wherein the plurality of groups of signal detection results are obtained by grouping data signal detection results, and wherein the data signal detection results are obtained by detecting a data signal based on a sample channel matrix of the first sample channel matrices.

5. The channel estimation apparatus according to claim 3, wherein the channel estimation apparatus is a device or a chip.

6. A channel estimation apparatus, comprising:

at least one processor; and one or more memories coupled to the at least one processor and storing programming instructions for execution by the at least one processor to perform operations comprising:

performing iteration processing for N times based on a channel estimation algorithm, wherein an input of the channel estimation algorithm is at least one sample channel matrix, wherein N is a positive integer, and wherein each of the N times of iteration processing comprises:

determining data signal detection results of a data signal based on at least one sample channel matrix;

grouping the data signal detection results to obtain a plurality of groups of signal detection results;

performing channel estimation based on at least one group of signal detection results in the plurality of groups of signal detection results to obtain at least one estimated channel matrix;

determining whether a current iteration processing is an $N^{th}$ time of the N times of iteration processing;

in response to determining that the current iteration processing is not the $N^{th}$ time of the N times of iteration processing, using the obtained at least one estimated channel matrix as the at least one sample channel matrix for a next iteration processing; and in response to determining that the current iteration processing is the $N^{th}$ time of the N times of iteration processing, determining the at least one estimated channel matrix as a channel estimation result.

7. The channel estimation apparatus according to claim 6, wherein the at least one sample channel matrix used as the input comprises a sample channel matrix having an optimal cost function value.

8. The channel estimation apparatus according to claim 7, wherein the the at least one sample channel matrix comprises first sample channel matrices and second sample channel matrices, the first sample channel matrices are determined based on a previous sample channel matrix or a reference signal.

9. The channel estimation apparatus according to claim 8, wherein at least one of the second sample channel matrices is a sum of a sample channel matrix of the first sample channel matrices and a first perturbation matrix, and each element in the first perturbation matrix is a complex-valued Gaussian random variable with an average value of 0 and a variance of $\sigma^2$, wherein the second sample channel matrices are generated based on a preset random algorithm; or performing channel estimation based on at least one group of signal detection results in a plurality of groups of signal detection results, wherein the plurality of groups of signal detection results are obtained by grouping data signal detection results, and wherein the data signal detection results are obtained by detecting a data signal based on a sample channel matrix of the first sample channel matrices.

10. The channel estimation apparatus according to claim 7, wherein the at least one sample channel matrix used as the input are randomly generated sample channel matrices.

11. The channel estimation apparatus according to claim 6, wherein a sample channel matrix having an optimal cost function value is used for performing the N times of iteration processing except for a first time of the N times.

12. The channel estimation apparatus according to claim 11, wherein the sample channel matrix having the optimal cost function value is obtained by processing a plurality of sample channel matrices, and the plurality of sample channel matrices comprise the at least one estimated channel matrix.

13. The channel estimation apparatus according to claim 12, wherein the plurality of sample channel matrices further comprise a randomly generated sample channel matrix.

14. The channel estimation apparatus according to claim 12, wherein at least one of the plurality of sample channel matrices is generated based on:

a sum of the sample channel matrix having the optimal cost function value and a second perturbation matrix, and each element in the second perturbation matrix is a complex-valued Gaussian random variable with an average value of 0 and a variance of $\sigma^2$;

a preset random algorithm; or performing channel estimation based on at least one group of signal detection results in the plurality of groups of signal detection results, wherein the plurality of groups of signal detection results are obtained by grouping the data signal detection results, and wherein the data signal detection results are obtained by detecting the data signal based on a sample channel matrix of the first sample channel matrices.

15. The channel estimation apparatus according to claim 6, wherein the channel estimation apparatus is a device or a chip.

* * * * *

UNITED STATES PATENT AND TRADEMARK OFFICE
CERTIFICATE OF CORRECTION

PATENT NO. : 12,057,972 B2
APPLICATION NO. : 17/732786
DATED : August 6, 2024
INVENTOR(S) : Xiang Gao and Kunpeng Liu Page 1 of 1

It is certified that error appears in the above-identified patent and that said Letters Patent is hereby corrected as shown below:

In the Claims

In Column 42, In Line 9, In Claim 8, delete "the the" and insert -- the --.

Signed and Sealed this
Twenty-sixth Day of November, 2024

Katherine Kelly Vidal
*Director of the United States Patent and Trademark Office*